United States Patent
Ulrich et al.

(10) Patent No.: US 6,618,113 B1
(45) Date of Patent: Sep. 9, 2003

(54) LIQUID CRYSTAL DEVICE

(75) Inventors: Diana Cynthia Ulrich, Oxfordshire (GB); Craig Tombling, Oxfordshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/712,031

(22) Filed: Nov. 14, 2000

(30) Foreign Application Priority Data

Nov. 16, 1999 (GB) .................................. 9926928

(51) Int. Cl.⁷ .................................. G02F 1/1339
(52) U.S. Cl. .................................. 349/156; 349/89
(58) Field of Search .................................. 349/156, 155, 349/86, 87, 88, 89

(56) References Cited

U.S. PATENT DOCUMENTS

| | | | |
|---|---|---|---|
| 5,568,283 A | 10/1996 | Mitsutake et al. | 359/53 |
| 5,627,665 A * | 5/1997 | Yamada et al. | 349/156 |
| 5,729,319 A * | 3/1998 | Inou et al. | 349/156 |
| 5,739,882 A * | 4/1998 | Shimizu et al. | 349/123 |
| 5,739,889 A | 4/1998 | Yamada et al. | 349/156 |
| 5,784,137 A | 7/1998 | Shiomi et al. | 349/88 |
| 5,831,703 A * | 11/1998 | Nishiguchi et al. | 349/117 |
| 5,956,112 A * | 9/1999 | Fujimori et al. | 349/156 |

FOREIGN PATENT DOCUMENTS

| | | |
|---|---|---|
| DE | 28 49 402 | 5/1980 |
| DE | 196 44 913 A1 | 4/1998 |
| JP | 62087936 | 4/1987 |
| WO | 90/09614 | 8/1990 |

OTHER PUBLICATIONS

European Search Report, Application No. EP 00 31 0110, dated Aug. 21, 2001.

* cited by examiner

Primary Examiner—Toan Ton
Assistant Examiner—David Chung
(74) Attorney, Agent, or Firm—Renner, Otto, Boisselle & Sklar

(57) ABSTRACT

A liquid crystal device comprises pixels which are switchable between a white state and a black state. Spacers are disposed in gaps between the pixels and are birefringent such that the spacers have the same optical properties as liquid crystal in the black state. For example, the spacers may have the same retardation as the liquid crystal layer with an optic axis fixed in the direction of the optic axis of the liquid crystal when in the black state.

29 Claims, 22 Drawing Sheets

LIQUID CRYSTAL DEVICE

BACKGROUND OF THE INVENTION

1. Field of the Invention

The present invention relates to a liquid crystal device (LCD). Such LCDs may be used in reflective or transmissive configurations.

2. Description of the Related Art

FIG. 1 of the accompanying drawings illustrates a known type of reflective LCD having a passive matrix addressing arrangement. The device comprises mirror electrodes 1 in the form of parallel stripes extending vertically in FIG. 1. The mirror electrodes 1 are disposed above a rear light absorber 2 which is visible in the view from above of FIG. 1 in the gaps between the mirror electrodes 1. Transparent electrodes, such as indium tin oxide (ITO) electrodes 3 are disposed above the liquid crystal layer and take the form of elongate parallel electrodes which extend horizontally in FIG. 1. The gaps between the electrodes 3 result in unaddressed regions 4 which are disposed above the reflective mirror electrodes 1. Thus, light passing through the regions 4 is reflected and is not absorbed by the rear absorber 2.

The LCD shown in FIG. 1 is of the ferroelectric liquid crystal (FLC) type in which the liquid crystal layer acts as a retarder with in-plane optic axes switching. A fixed quarter wave plate with its optic axis oriented at 75° is disposed between the FLC layer and the mirror electrodes. Picture elements (pixels) in the white state, such as 5, have their optic axes switched to an angle of −7.5° whereas pixels such as 6 in the black state have their optic axes switched to an angle of +15°. The unaddressed regions 4 are not subjected to an applied addressing field between the electrodes 1 and the electrodes 3 and thus adopt an undefined state. This state corresponds to a non-black state so that incident light on the regions 4 is at least partly reflected and is visible to a viewer of the display. This results in a reduction of the contrast ratio.

A known technique for avoiding this problem is disclosed in D. G. McDonnell et al, "An Ultra-High-Resolution Ferroelectric Liquid-Crystal Video Display", Digest of Technical Papers, Society for Information Display International Symposium, 1993, p 654. According to this technique, the liquid crystal in the inter-pixel gaps or regions such as 4 in FIG. 1 to switched by fringing fields into a controlled state. However, it is not always possible to achieve such switching, for example because of limitations in addressing, device configuration and material characteristics or because the inter-pixel gap contains a non-switchable spacing element.

In cases where it is not possible to switch the inter-pixel gaps, it is known to provide a black matrix for masking such regions, for example as disclosed in Koden et al, "Key Technologies for the τ-$V_{min}$ Mode FLCD", IDW 1997, p 269 and in D. E. Castleberry et al, "A One Mega-Pixel Colour a-Si TFT Liquid-Crystal Display", Digest of Technical Papers, Society for Information Display International Symposium, 1988, p 232. However, this increases the processing steps and hence the cost of making such displays and decreases the fill factor of the display.

It is also known to provide cell spacing by means of patterned structures of uniform height but this also reduces the contrast ratio of LCDs. For example, Koden et al (as mentioned above) describes the use of continuous spacer walls to achieve mechanical stability in smectic devices and Colgan et al "On-chip metallisation layers for reflective light valves", IBM Journal of Research and Development, vol. 42 no. 3 1998 discloses the use of silicon dioxide spacer posts at the corners of pixels. FIG. 2 of the accompanying drawings illustrates the arrangement of such known devices with spacer walls 7 disposed in the gaps between the upper electrodes 3. The spacers 7 are transparent and are made of substantially isotropic material. Incident light is therefore reflected by the underlying portions of the mirror electrodes 1 and this again reduces the contrast ratio of such LCDs.

It Is known for the spacer walls 7 to be disposed between the gaps in the mirror electrodes 1 as illustrated in FIGS. 3 and 4 of the accompanying drawings. However, any Inaccuracies in positioning and size of the spacer walls 7 results in a reduction of contrast ratio. For example, as shown in FIG. 3 at 8, the spacer walls 7 are misaligned with the gaps between the mirror electrodes 1 and are therefore skewed so as to overlap the partially reflective regions of the pixels. Translational errors may also occur and result in the spacer wall 7 overlapping the partially reflective regions. As shown in FIG. 4 at 9, if the spacer walls 7 are too wide, they will again overlap the mirror electrodes 1. Light passing through the spacer walls 7 and striking the overlapping portions of the mirror electrodes 1 is reflected back out of the LCD and results in a reduction in contrast ratio.

The spacers 7 may be made of a black polymer material, for example as disclosed in D. E. Castleberry et al (as mentioned above) and in C. M. Healer et al. "Pigment-Dispersed Organic Black-matrix Photoresists For LCD Colour Filters", SID 1995 Digest, p 446. However, in order to avoid compromising the contrast ratio of the LCD, such a material would have to have sufficient light-absorbing properties and, in practice, there is some reduction in contrast ratio. Also, the spacers are disposed within the liquid crystal layer and the dyes or pigments used in such materials can contaminate the liquid crystal. This compromises the alignment quality and switching behaviour of the LCD.

The presence of the spacers 7 in the liquid crystal layer can also cause "pinning" of the liquid crystal molecules adjacent the spacers so that the liquid crystal adjacent the spacers is not substantially affected by the applied addressing field. As described hereinafter, the liquid crystal may be pinned in the black or white state and this reduces contrast ratio and aperture ratio of the device. It is thus necessary to provide a black matrix which is wider than the spacers 7 so as to mask such pinned white states. This increases the number of production process steps and hence the cost of such devices while substantially decreasing the fill factor of such devices.

SUMMARY OF THE INVENTION

According to the invention, there is provided a liquid crystal device comprising a liquid crystal layer containing a plurality of pixels separated by inter-pixel gaps, each of the pixels having a first optical state resulting in maximum light attenuation, characterised by at least one spacer disposed in the inter-pixel gaps and having substantially the same optical property as the first pixel optical state.

The at least one spacer may comprise a plurality of pillars.

The at least one spacer may comprise a plurality of walls. The walls may be continuous. The walls may enclose the pixels. The wells may fill the inter-pixel gaps.

The optical property may comprise changing the polarisation of light. The optical property may comprise retardation with a predetermined optic axis orientation. The device may comprise a linear polariser for transmitting light with a first direction of linear polarisation, a reflector, a half waveplate disposed between the polariser and the reflector and a quarter waveplate disposed between the half waveplate and the reflector, the liquid crystal layer comprising one or both of the half waveplate and the quarter waveplate.

The liquid crystal layer may be of the in-plane switching type and the at least one spacer may have the same retardation as the liquid crystal layer and an optic axis oriented in the same direction as the liquid crystal layer in the first optical state. The liquid crystal of the layer may be a smectic liquid crystal. The liquid crystal may be a ferroelectric liquid crystal.

The liquid crystal layer may comprise the half waveplate whose optic axis is switchable between −7.5° and +15° to the first direction, the at least one spacer may have an optic axis at +15° to the first direction, and the quarter waveplate may have an optic axis at +75° to the first direction.

The liquid crystal layer may comprise the quarter waveplate whose optic axis is switchable between 75° and 120° to the first direction, the at least one spacer may have an optic axis at 75° to the first direction, and the half waveplate may have an optic axis at 15° to the first direction.

The liquid crystal layer may comprise the half waveplate whose optic axis is switchable between 0° and 15° to the first: direction, the at least one spacer may have an optic axis at 15° to the first direction and the quarter waveplate may comprise a further liquid crystal layer whose optic axis is switchable between 75° and 90° to the first direction and at least one further spacer having an optic axis at 75° to the first direction.

The liquid crystal of the layer may be a nematic liquid crystal. The liquid crystal layer may be a bistable twisted nematic liquid crystal layer.

The liquid crystal layer may comprise the quarter waveplate which is switchable between a 0° twist state with an optic axis at 75° to the first direction and a 360° twist state, the at least one spacer may have an optic axis at 75° to the first direction and the half waveplate may have an optic axis at 15° to the first direction.

The liquid crystal layer may comprise the quarter waveplate which is switchable between a 0° twist state with an optic axis at 100° to the first direction and a 360° twist state, the at least one spacer may have an optic axis at 100° to the first direction, the half waveplate may have an optic axis at α° to the first direction, and a further half waveplate having an optic axis at 5α° to the first direction may be disposed between the half waveplate and the liquid crystal layer. α may be equal to 6.9°.

The device may comprise a linear polariser for transmitting light with a first direction of linear polarisation, a reflector, and a retarder having a retardation of substantially 208 nm and an optic axis at 14° to the first direction, the liquid crystal layer being disposed between the retarder and the reflector and being switchable between a 67° twist state, having a retardation of substantially 136 nm and an optic axis at a surface of liquid crystal layer nearer the retarder at 29° to the first direction, and a −293° or +427° twist state, the at least one spacer having an optic axis at a surface thereof nearer the retarder at 29° to the first direction and a 67°0 twist state.

The at least one spacer may have an optical anisotropy which is greater than that of the liquid crystal layer and may be provided with an optically isotropic further spacer such that the combined thickness of the at least one spacer and the further spacer is substantially equal to the thickness of the liquid crystal layer.

The liquid crystal layer may have an optical anisotropy which is greater than that of the at least one spacer and may be provided with an optically isotropic further spacer such that the combined thickness of the liquid crystal layer and the further spacer is substantially equal to the thickness of the at least one spacer.

The at least one spacer may comprise a cured reactive mesogen.

The at least one spacer may be arranged to bias the liquid crystal of the layer in contact therewith to the first optical state. The at least one spacer may be optically anisotropic and may have a molecular alignment corresponding to the molecular alignment of the liquid crystal when in the first optical state.

The device may comprise a passive matrix addressing arrangement including a set of stripe electrodes constituting a or the reflector.

It is thus possible to provide a device in which one or more spacers have the same optical property as the "black" liquid crystal state. The presence of such a spacer or spacers results in little or no loss of contrast ratio in such devices. For example, such spacers may be disposed above reflective regions of a reflective display, for example as illustrated in FIGS. 1 and 5 of the accompanying drawings, so as substantially to prevent reflection from the underlying reflector.

Such spacers may also be arranged to bias the "black" state of the liquid crystal adjacent the spacers. This eliminates or reduces the problem of white state pinning as described hereinbefore and thus avoids substantial reduction in contrast ratio or the need to provide a larger black matrix area.

BRIEF DESCRIPTION OF THE DRAWINGS

The present invention will be further described, by way of example, with reference to the accompanying drawings, in which.

Like reference numerals reference to like parts throughout the drawings.

DESCRIPTION OF THE PREFERRED EMBODIMENTS

Figure 1:
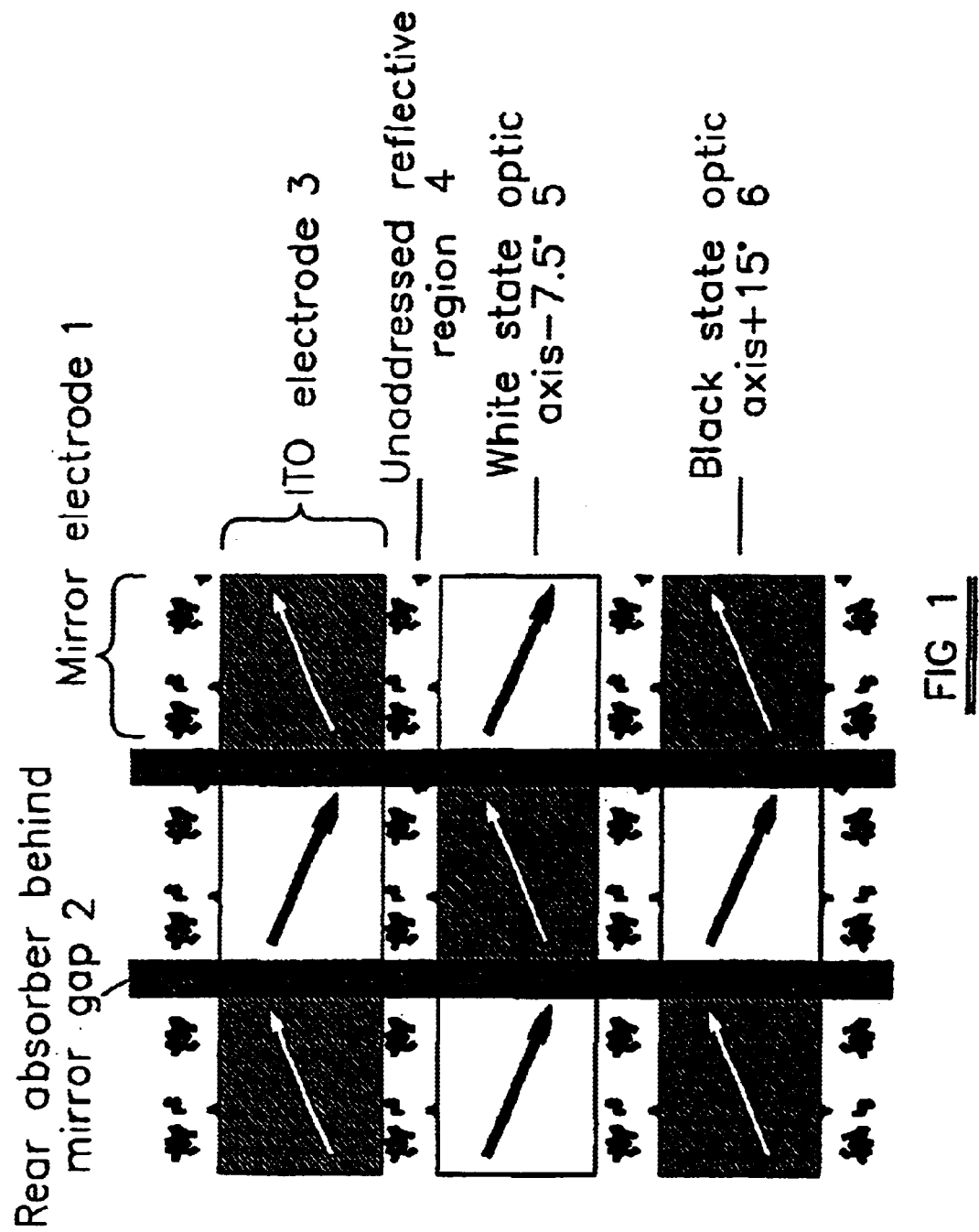
FIG. 1 is a diagrammatic view from above of a known type of LCD.
Figure 2:
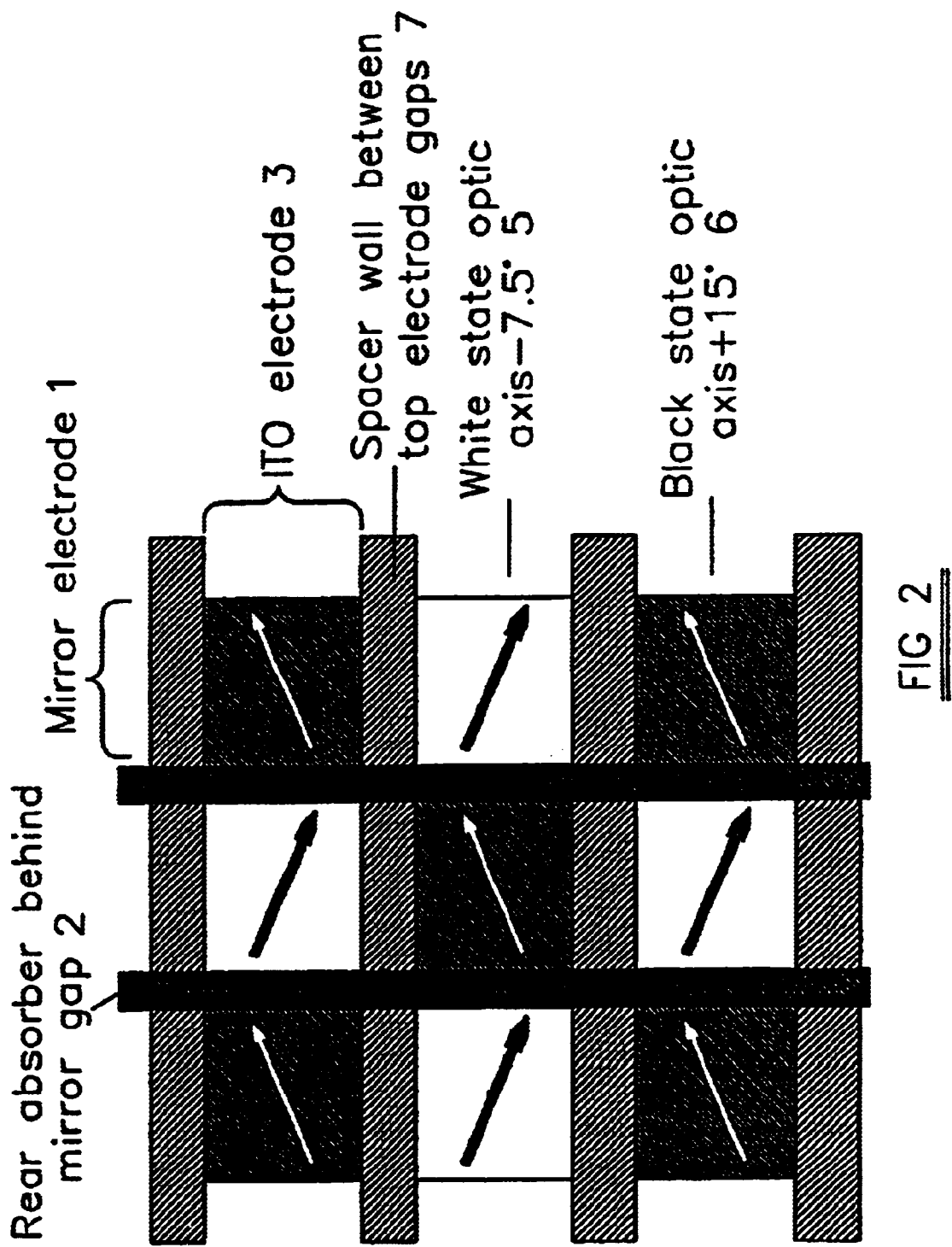
FIG. 2 is a diagrammatic view from above of another known type of LCD.
Figure 3:
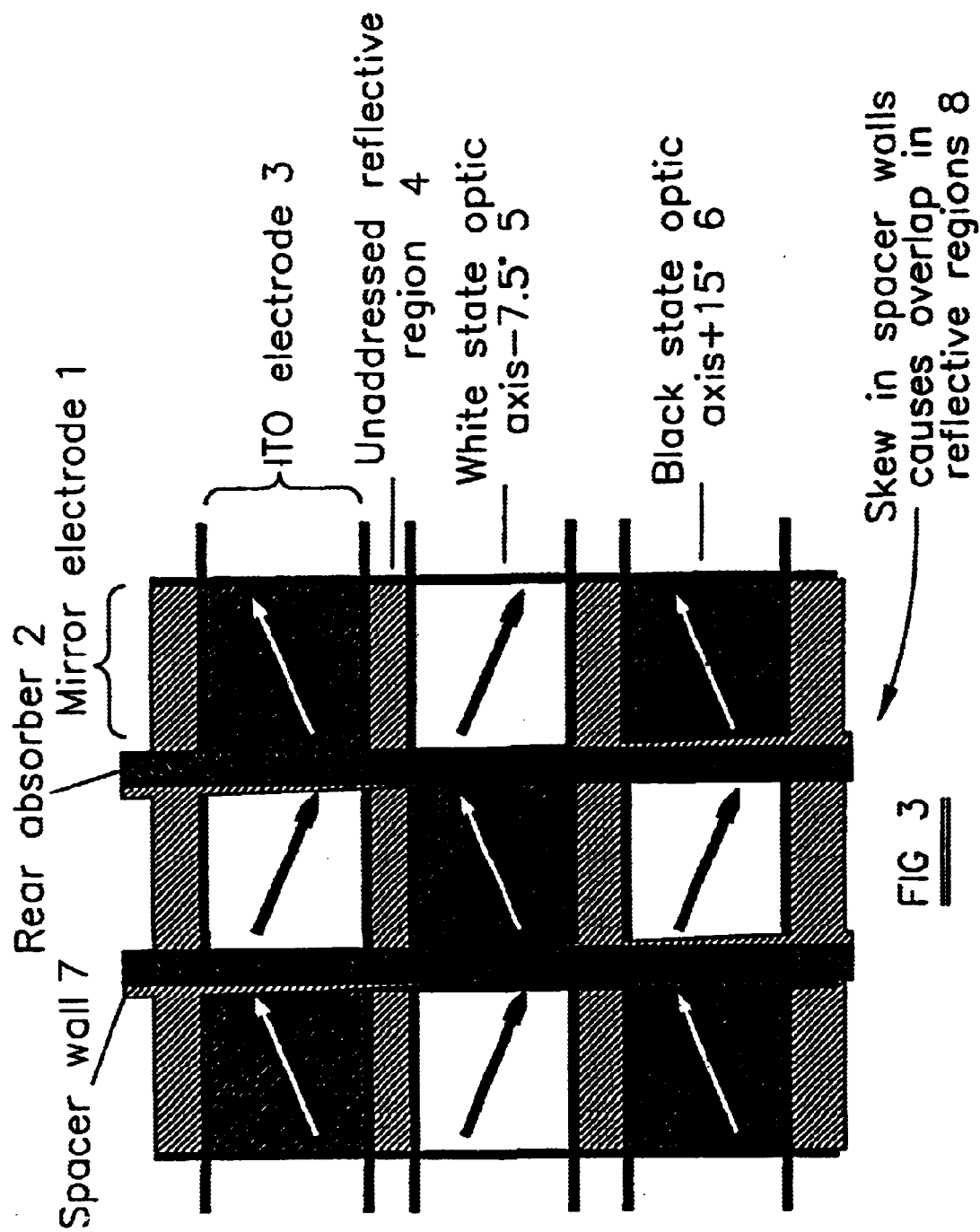
FIGS. 3 and 4 are diagrammatic views from above of a known type of LCD illustrating spacer misalignment and size mismatches.
Figure 4:
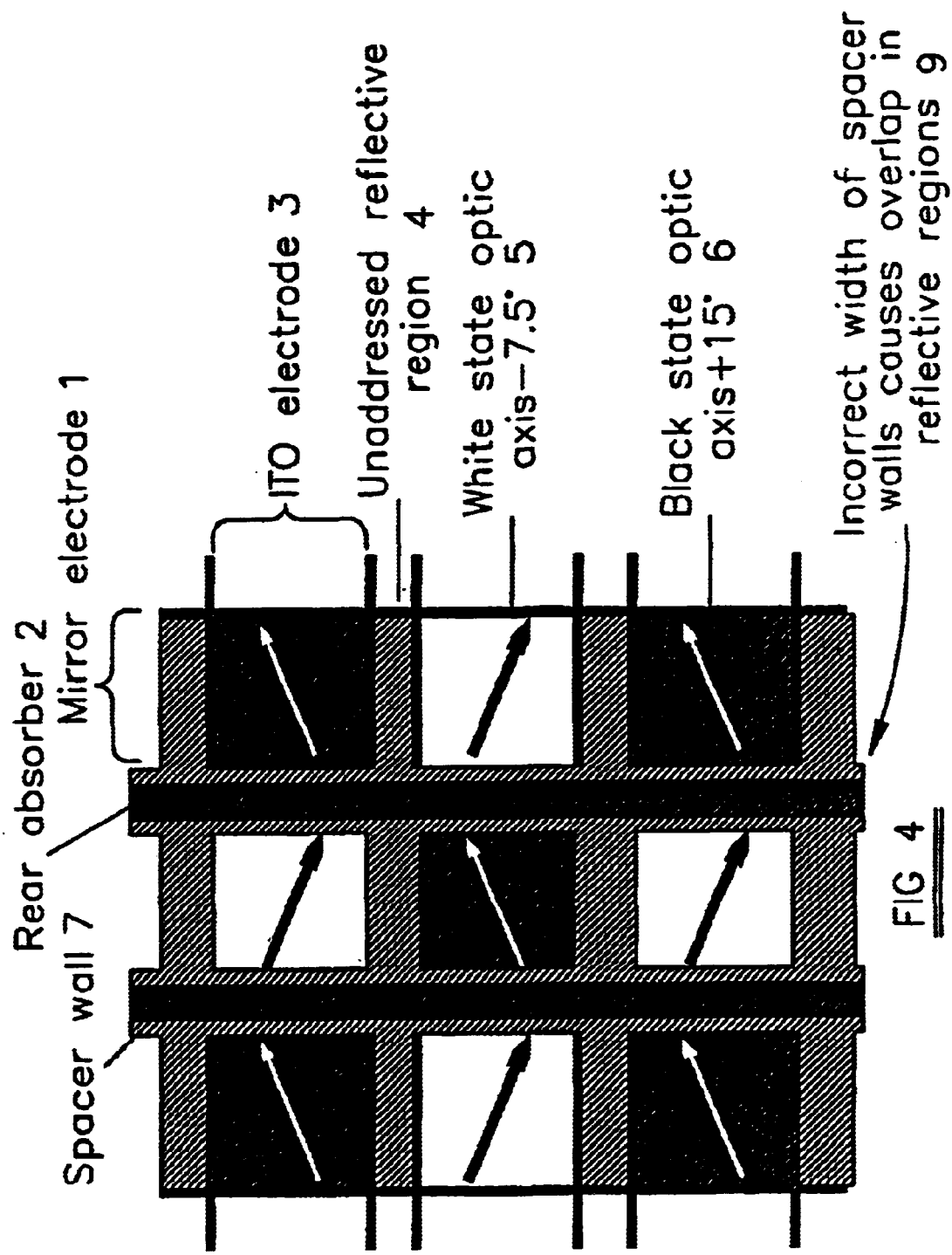
Figure 5:
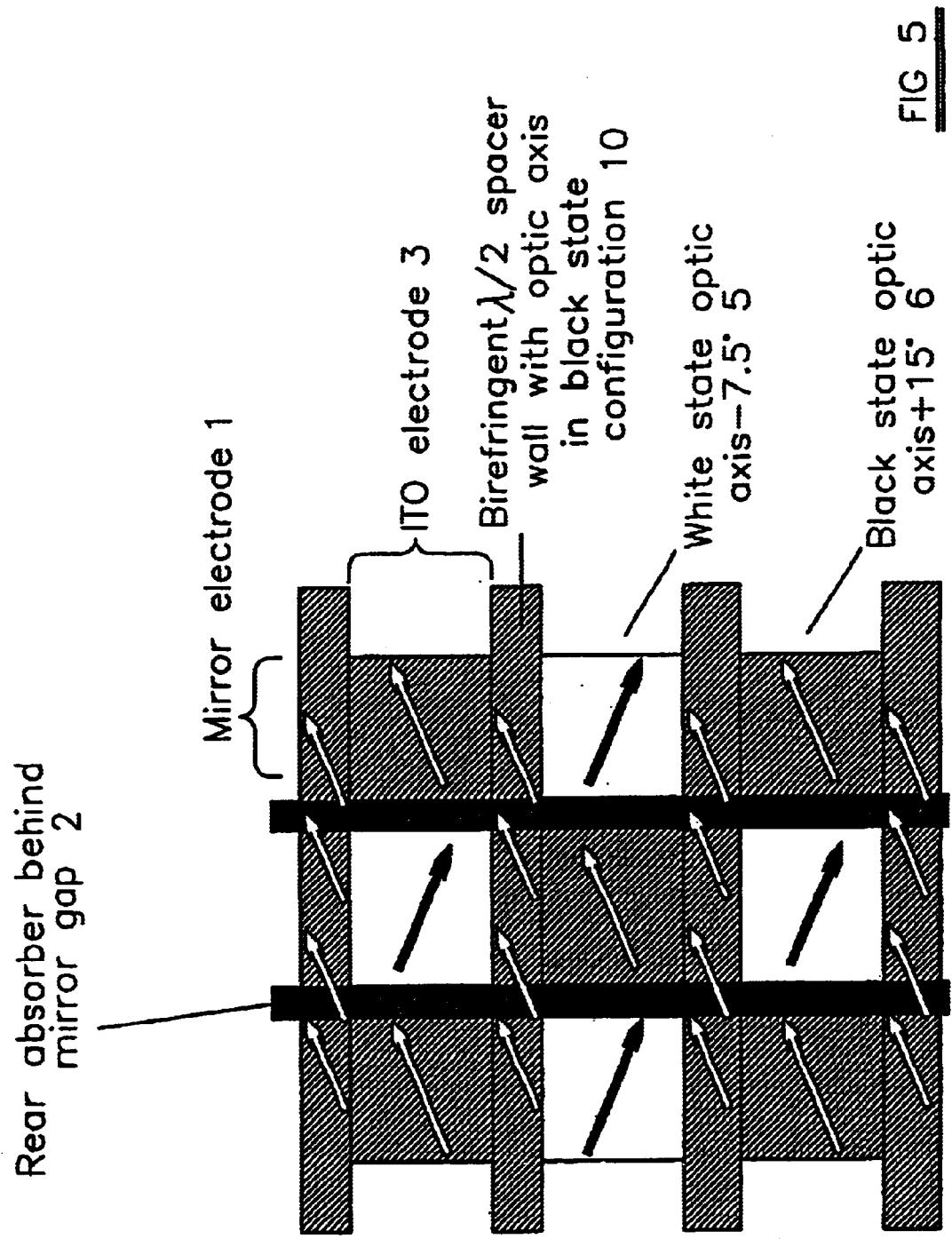
FIG. 5 is a diagrammatic view from above of an LCD constituting a first embodiment of the invention.

The LCD shown in FIG. 5 is of the same basic type as that shown in FIG. 1 and disclosed in GB 2 318 878 and EP 0 840 160, namely a reflective in-plane switching LCD of ferroelectric-type. However, the LCD of FIG. 5 differs from that of FIGS. 1 and 2 in that a birefringent spacer wall 10 is disposed in the gap between adjacent pairs of electrodes 3.

Figure 6:
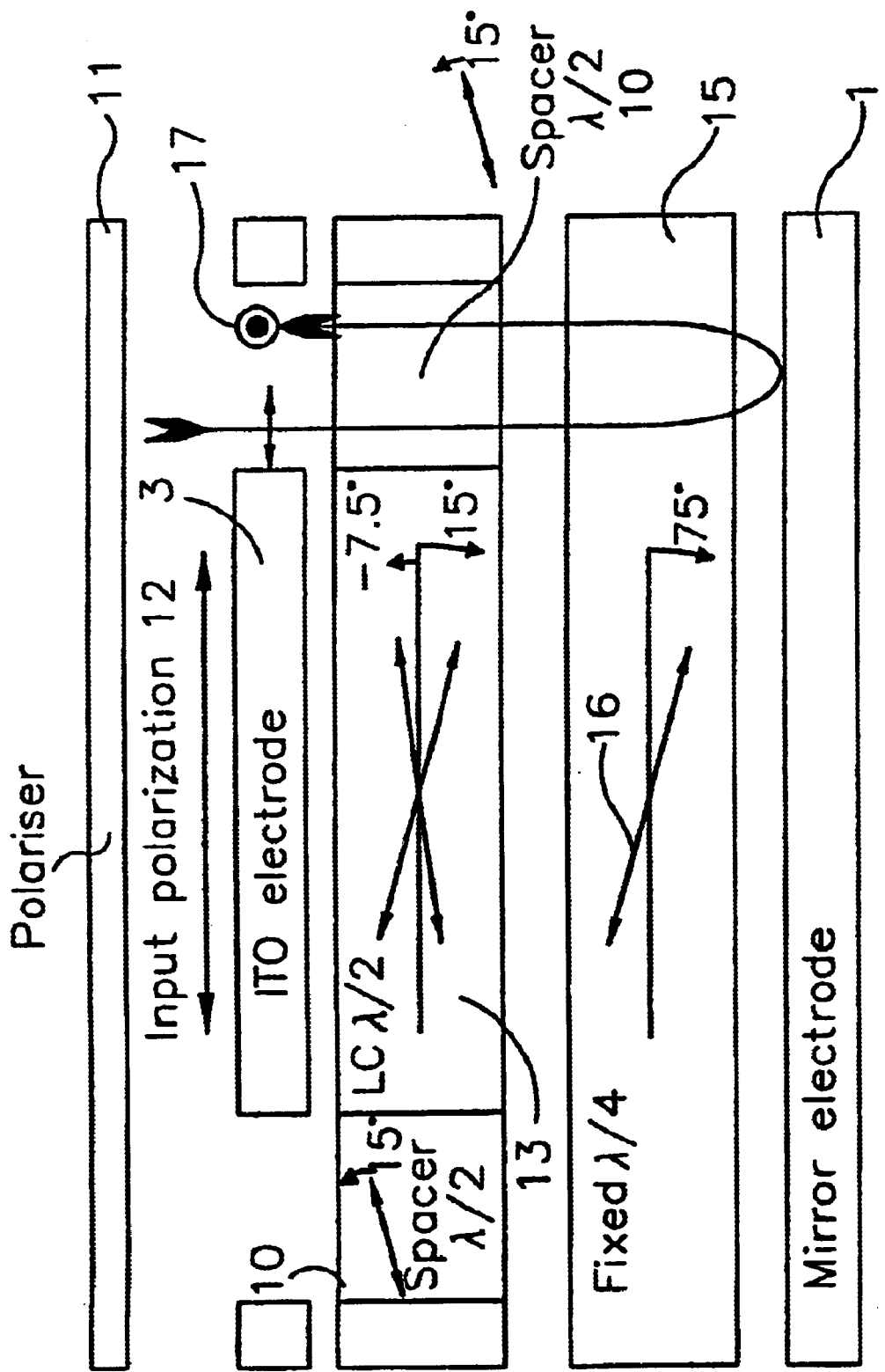
FIG. 6 is a diagrammatic cross-sectional view of the LCD of FIG. 5.

The LCD is shown in more detail in FIG. 6. A linear polariser 11 polarises incident light such that it has an input polarisation 12 in a first direction. The device comprises a ferroelectric liquid crystal layer 13 whose birefringence and thickness are such that the layer 13 acts as a half waveplate, for example for a wavelength of light at or adjacent the middle of the visible spectrum. The layer 13 has an optic axis with an in-plane switching angle of 22.5° so that the liquid crystal layer optic axis is switchable between −7.5° and +15° with respect to the first direction. The sign convention for angles referred to herein is of no importance provided positive angles are measured in one direction and negative angles are measured in the opposite direction throughout.

The optical properties described herein are valid only for the design wavelength of optical elements. The design wavelength is normally chosen to be in the middle of the visible spectrum.

The birefringent spacer walls 10 are disposed in the liquid crystal layer 13 and have a birefringence and thickness such that the spacer walls 10 act as half waveplates with the same retardation as the liquid crystal layer 13. The optic axes of the spacer walls 10 are oriented at 15° with respect to the input polarisation or first direction 12.

The LCD further comprises a quarter waveplate 15 disposed between the liquid crystal layer 13 and the mirror electrode 1. The quarter waveplate 15 provides a quarter wave of retardation at the wavelength for which the liquid crystal layer 13 is a half wave retarder. The quarter waveplate 15 has an optic axis 16 which is fixed at an "in-plane" angle of 75° to the input polarisation 12.

When the liquid crystal layer optic axis is switched to +15°, the pixel is in its "black" state whereas, when the optic axis of the layer 13 is at −7.5°, the pixel is in its "white" state. The fixed orientation of the optic axis of the spacers 10 is oriented in the "black state direction" of the liquid crystal layer 13.

Light which is incident on the polariser 11, whose absorption axis is oriented at 90°, is polarised with a polarisation direction of 0°. The optic axis of each spacer 10 and the liquid crystal layer 13 in its "black" state is oriented at +15°. The polarisation of light which has passed through the layer 13 or the spacer 10 is rotated by twice the angle of the optic axis of the layer 13 or the spacer 10, which acts as a half waveplate, and is therefore oriented at an angle of 30°. The polarisation direction of light incident on the quarter waveplate 15 is thus at −45° to the optic axis of the plate 15 and is right handed circularly polarised by the plate 15.

Reflection by the mirror electrode 1 reverses the polarisation direction so that the reflected light is left handed circularly polarised when incident on the quarter waveplate. Light leaving the quarter waveplate 15 is thus polarised at +45° to the optic axis of the plate 15 and hence is polarised at 120°. The angle between the polarisation of light incident on the liquid crystal layer 13 or the spacer 10 is polarised at −105° with respect to the optic axis thereof and so leaves the layer 13 or the spacer 10 with a polarisation angle of −90°. The light returning to the polariser 11 is polarised parallel to the absorption axis of the polariser, which thus extinguishes the reflected light.

When the liquid crystal of a pixel has its optic axis oriented at −7.5°, the polarised light from the polariser 11 exits the layer 13 with its polarisation direction at −15°. The polarisation direction is therefore orthogonal to the optic axis of the quarter waveplate 16 and, passage of light through the plate 15 does not change its polarleation. Light reflected by the mirror electrode 1 has its polarisation direction changed by 180° and is incident on the plate 15 with a polarisation state orthogonal to the optic axis of the plate 15. The reflected light is thus incident on the layer 13 with its polarisation direction at −172.5° relative to the optic axis of the layer 13. Light exits the layer 13 with its polarisation direction at −180°. The polarisation is therefore parallel to the transmission axis of the polariser 11 so that substantially all of the light is transmitted.

Figure 7:
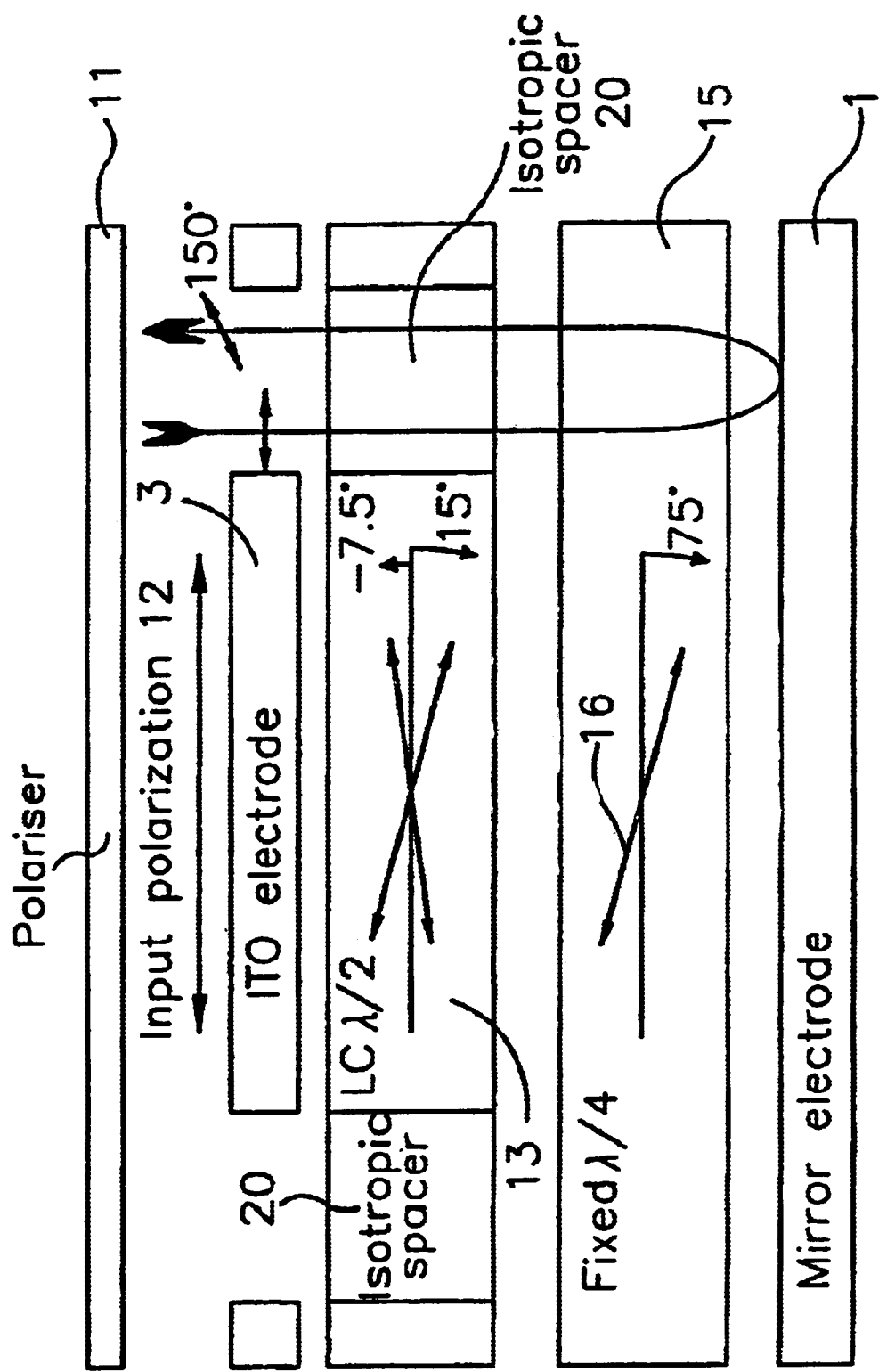
FIG. 7 is a cross-sectional diagram of an LCD of the type shown in FIG. 6 but with isotropic spacers.

FIG. 7 illustrates the effect of replacing the spacers 10 in the device shown in FIG. 6 with spacers 20 made of an isotropic material. Such a material has no substantial effect on the polarisation of light so that the light from the polariser 11 passing through the isotropic spacers 20 is incident upon the quarter waveplate 15 with a polarisation direction of 0°. The effect of the quarter waveplate 15 is to rotate the polarisation by 150° upon reflection. Upon passing through the isotropic spacer 20 for a second time, the polarization direction is unchanged. As the light passes through the polariser 11 for a second time, 25 percent of the light is absorbed, resulting in an overall reflectivity of 37.5%. Thus, a substantial proportion of light incident on the inter-pixel regions is reflected by any overlap with the mirror electrodes 1 and this reduces the contrast ratio of the device. However, in the device shown in FIG. 6, any overlap of the spacer walls 10 with the mirror electrode 1 does not compromise the contrast ratio of the device.

Figure 8:
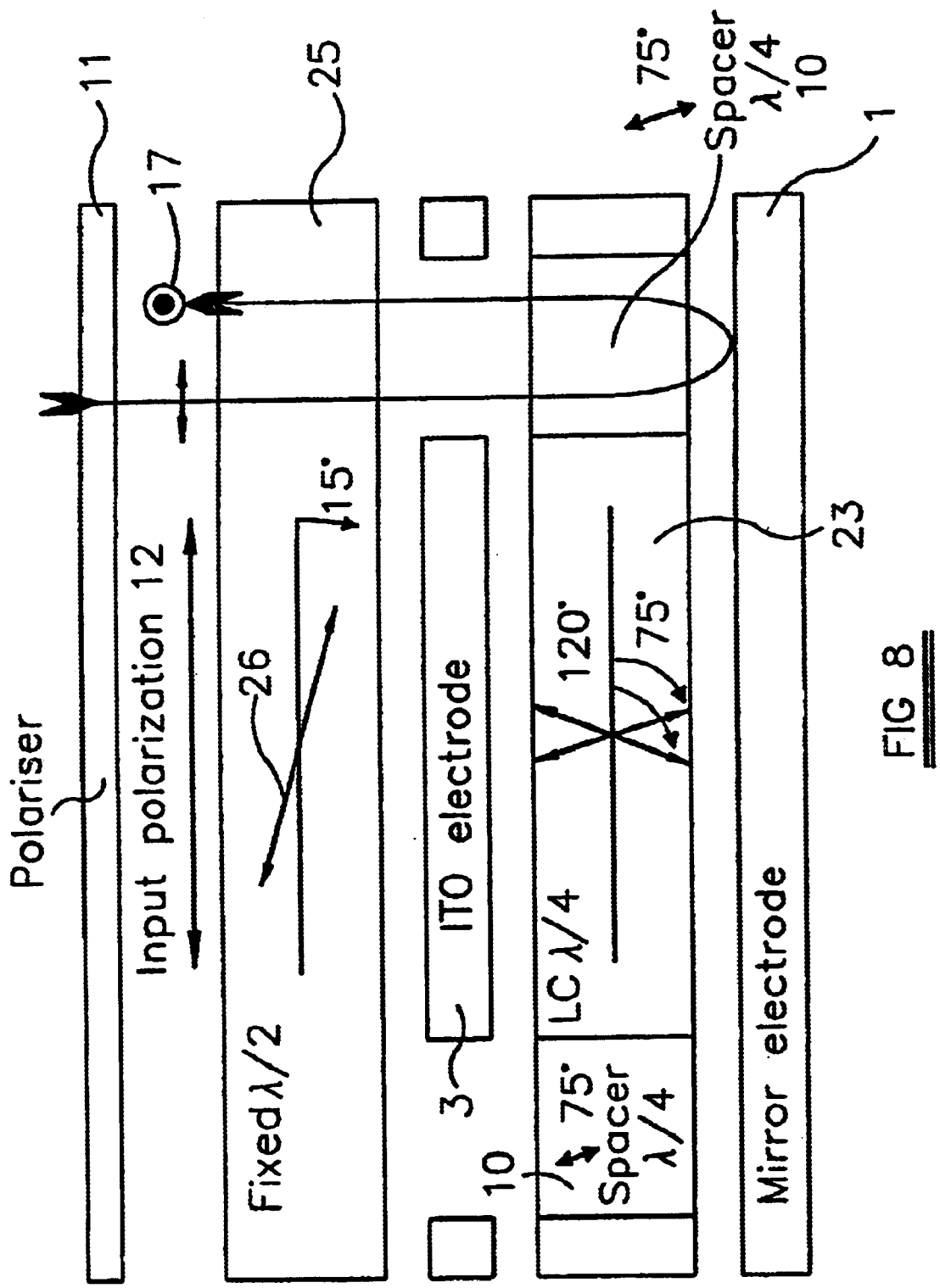
FIG. 8 is a cross-sectional diagram of an LCD constituting a second embodiment of the invention.

FIG. 8 illustrates an LCD of the type disclosed in WO 96/31577 which differs from that shown in FIG. 6 in that the liquid crystal layer 13 is replaced by a fixed half wave retarder 25 whose optic axis 26 is oriented at 15° to the input polarisation 12 whereas the fixed quarter wave retarder 15 is replaced by a liquid crystal layer 23 which acts as a quarter wave retarder having an optic axis in-plane switching angle of 45° such that the optic axis of the layer 23 is switchable between 75° and 120° relative to the input polarisation 12. The spacers 10 are disposed in the liquid crystal layer 23 and comprise fixed quarter waveplates whose optic axes are oriented at 75° to the input polarisation 12.

Figure 9:
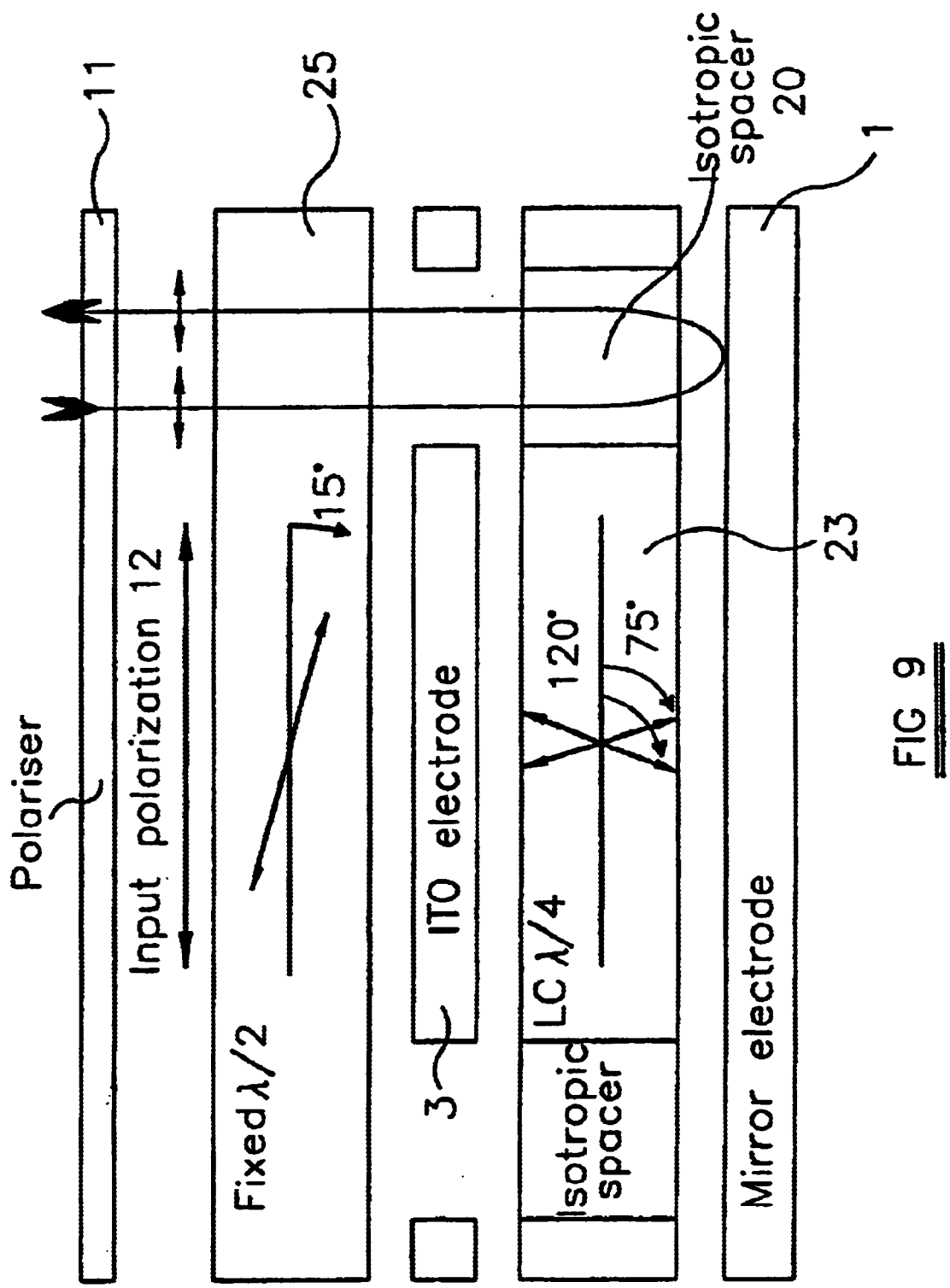
FIG. 9 is a cross-sectional diagram of a device of the type shown in FIG. 8 but with isotropic spacers.

In the black state of a pixel, the optic axis of the liquid crystal is oriented at 75° relative to the input polarization 12. The spacers 10 thus have the same optical effect as black liquid crystal pixels so that, if the spacers 10 overlap with the mirror electrodes 1, reflected light is substantially extinguished and the contrast ratio of the device is not substantially compromised. As shown in FIG. 9, if the spacers 10 were replaced by isotropic spacers 20, any overlap with the mirror electrodes 1 would result in light being reflected from such overlap region and reducing the contrast ratio of the display.

Figure 10:
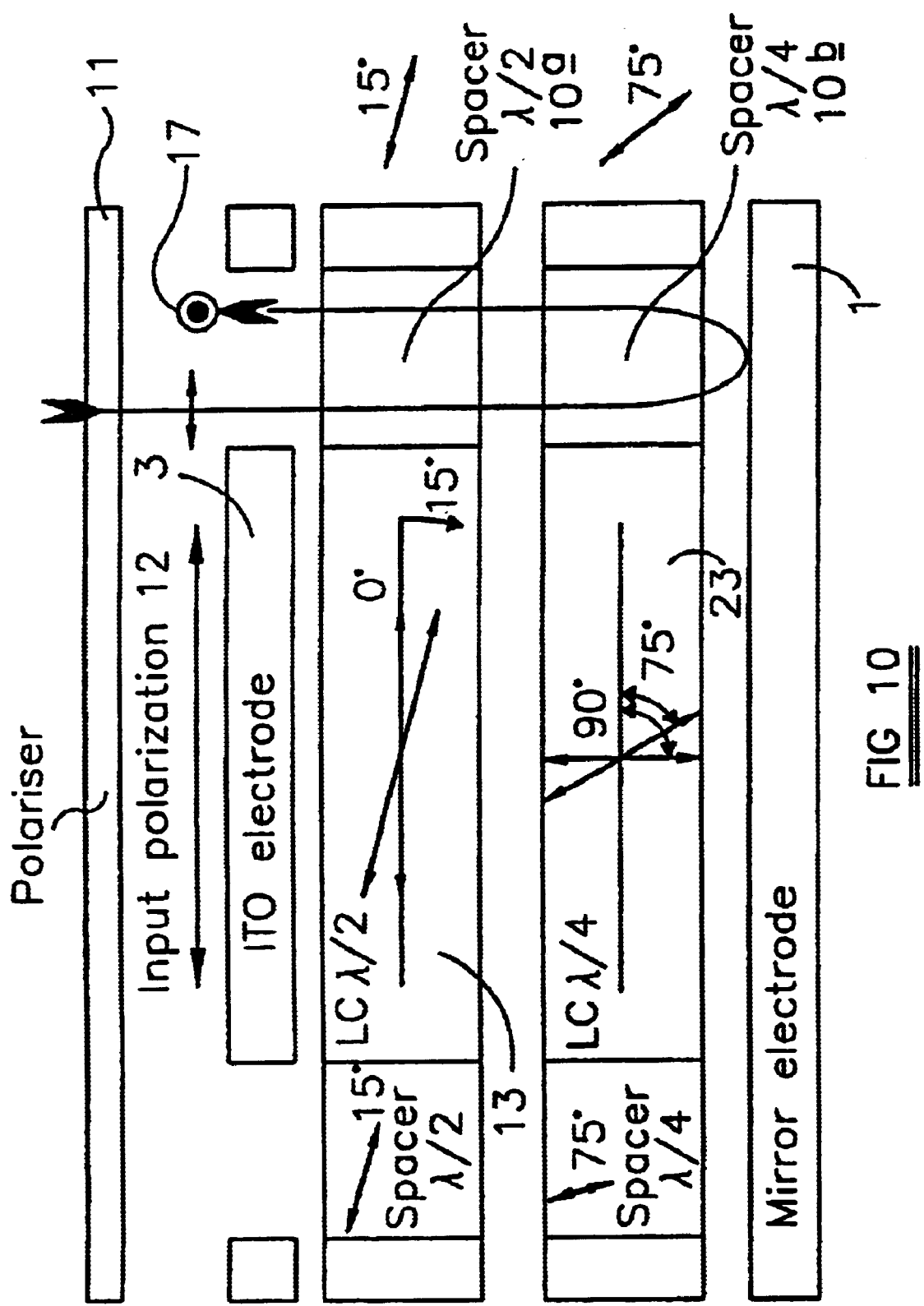
FIG. 10 is a cross-sectional diagram of an LCD constituting a third embodiment of the invention.

FIG. 10 illustrates an LCD of the type disclosed in GB 2 318 878 and EP 0 840 160 having a quarter wave liquid crystal layer 23 similar to that shown in FIG. 8 but with its optic axis switchable between 75° and 90°. The layer 23 contains spacers 10b providing a quarter wave of retardation with their optic axes oriented at 75° to the input polarisation 12.

The LCD of FIG. 10 has a layer 13 similar to that shown in FIG. 6 but with its optic axis switchable between 0° and 15° relative to the input polarization 12. The layer 13 contains spacers 10a which likewise provide a half wave of retardation with their optic axes oriented at 15° to the input polarisation 12.

Figure 11:
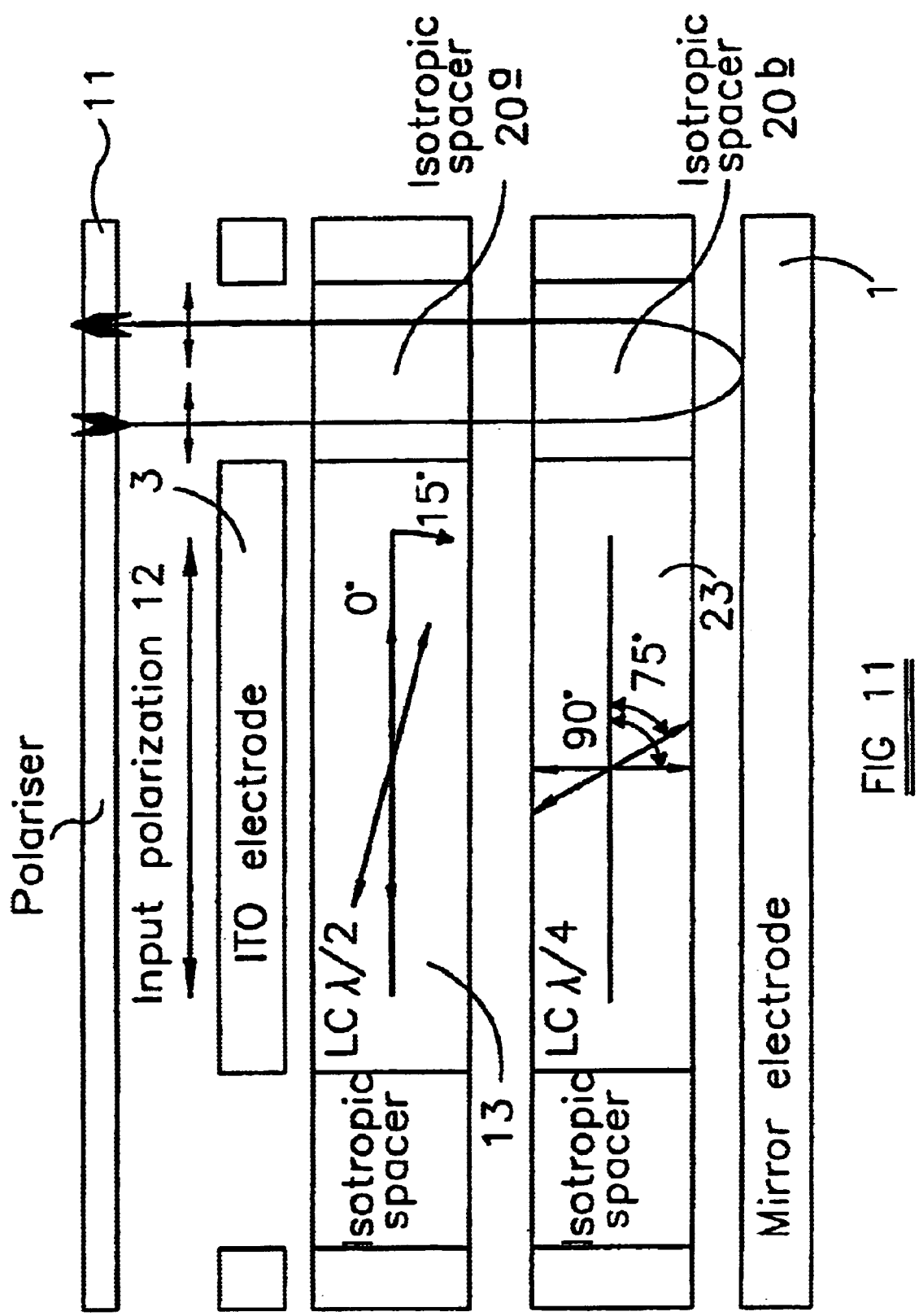
FIG. 11 is a cross-sectional diagram of a device of the type shown in FIG. 10 but with isotropic spacers.

The spacers 10a and 10b provide the same retardation and direction of optic axis as the liquid crystal layers 13 and 23 when in the black state. Thus, any overlap of the spacers with the mirror electrode 1 does not substantially affect the contrast ratio of the device. FIG. 11 illustrates a device of the type shown in FIG. 10 but with the anisotroplc spacers 10a and 10b replaced by isotropic spacers 20a and 20b. In this case, any overlap of the spacers with the mirror electrode 1 results in light being reflected out of the display and compromising the contrast ratio.

Figure 12:
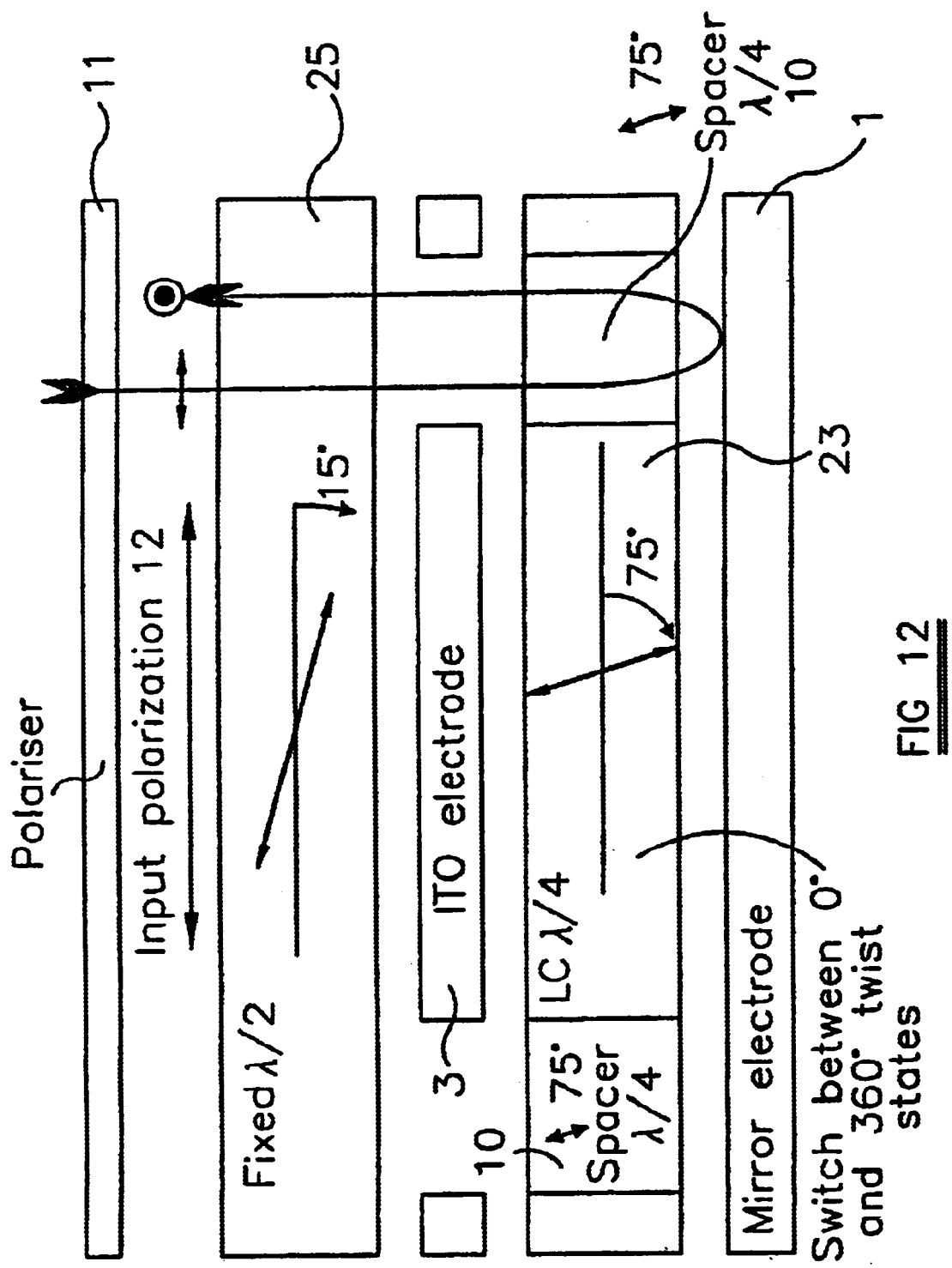
FIG. 12 is a cross-sectional diagram of an LCD constituting a fourth embodiment of the invention.

The device shown in FIG. 12 has the same general arrangement as that shown in FIG. 8 in that it comprises a fixed half waveplate 25 and a liquid crystal layer 23. However, the device of FIG. 12 is of the bistable twisted nematic (BTN) type, for example as disclosed in British patent application no. 9911246.8. In a first state, the liquid crystal of the layer 23 is untwisted and has its optic axis oriented at 75° with respect to the input polarisation 12. The layer 23 thus acts as a quarter waveplate. When switched to its other stable state, the liquid crystal of the layer 23 adopts a 360° twisted state and acts as an isotropic layer i.e. has no retardation. This corresponds to the white state of the device.

The spacers 10 comprise quarter waveplates whose optic axes are oriented in the same direction as the liquid crystal of the layer 23 when in the black state. Thus, if the spacers 10 overlap with the mirror electrode 1, any reflected light is extinguished by the polariser 11 and the contrast ratio of the device is not substantially reduced.

Figure 13:
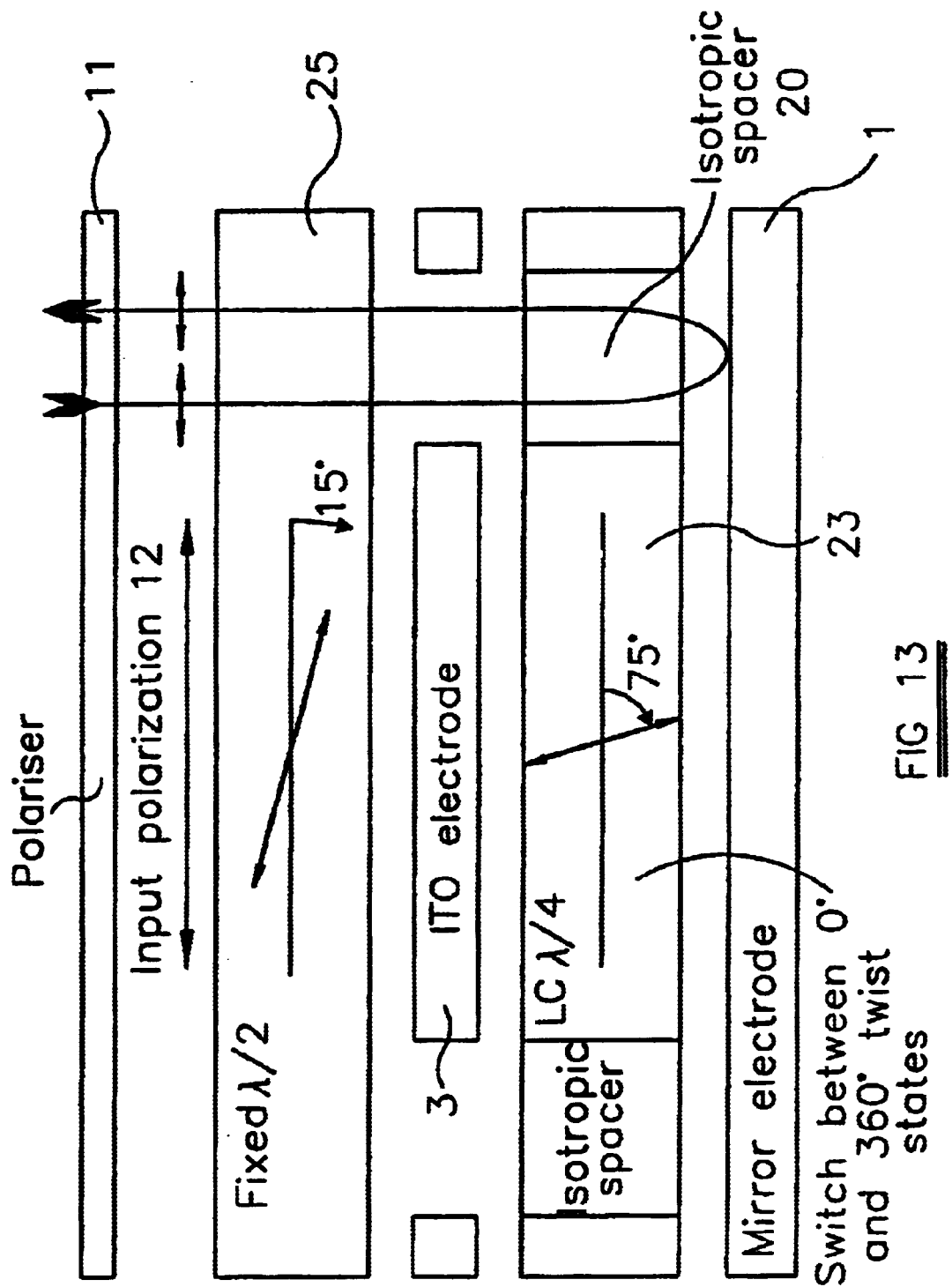
FIG. 13 is a cross-sectional diagram of a device of the type shown in FIG. 12 but with isotropic spacers.

FIG. 13 illustrates a device of the type shown in FIG. 12 with the anisotropic spacers 10 replaced by isotropic spacers 20. In this case, any overlap of the spacers 20 with the mirror electrode 1 results in reflected light being transmitted by the polariser 11, which results in a reduction of the contrast ratio of the display.

Figure 14:
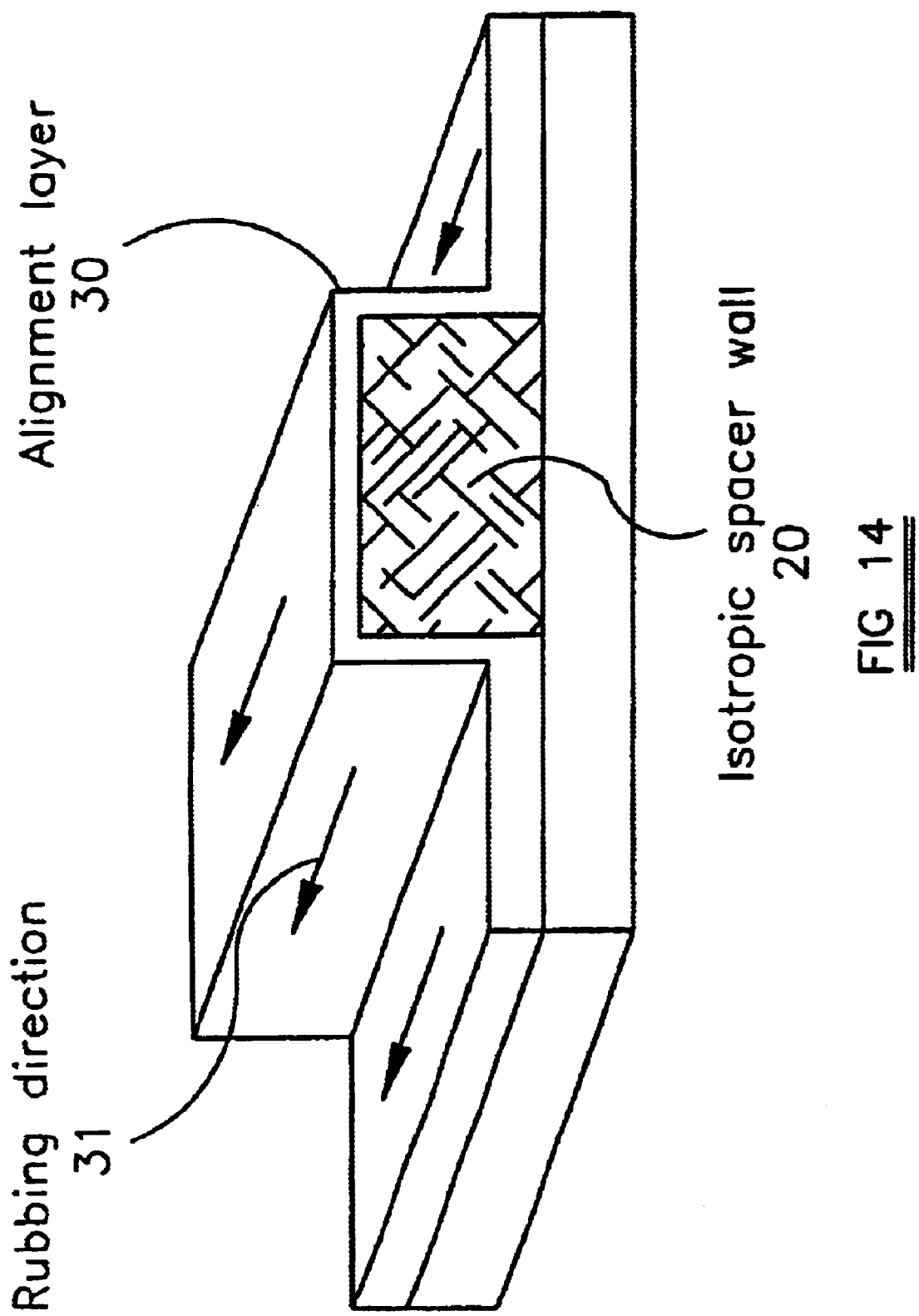
FIG. 14 is a diagram Illustrating an alignment layer formed on an isotropic, spacer wall of known type.
Figure 15:
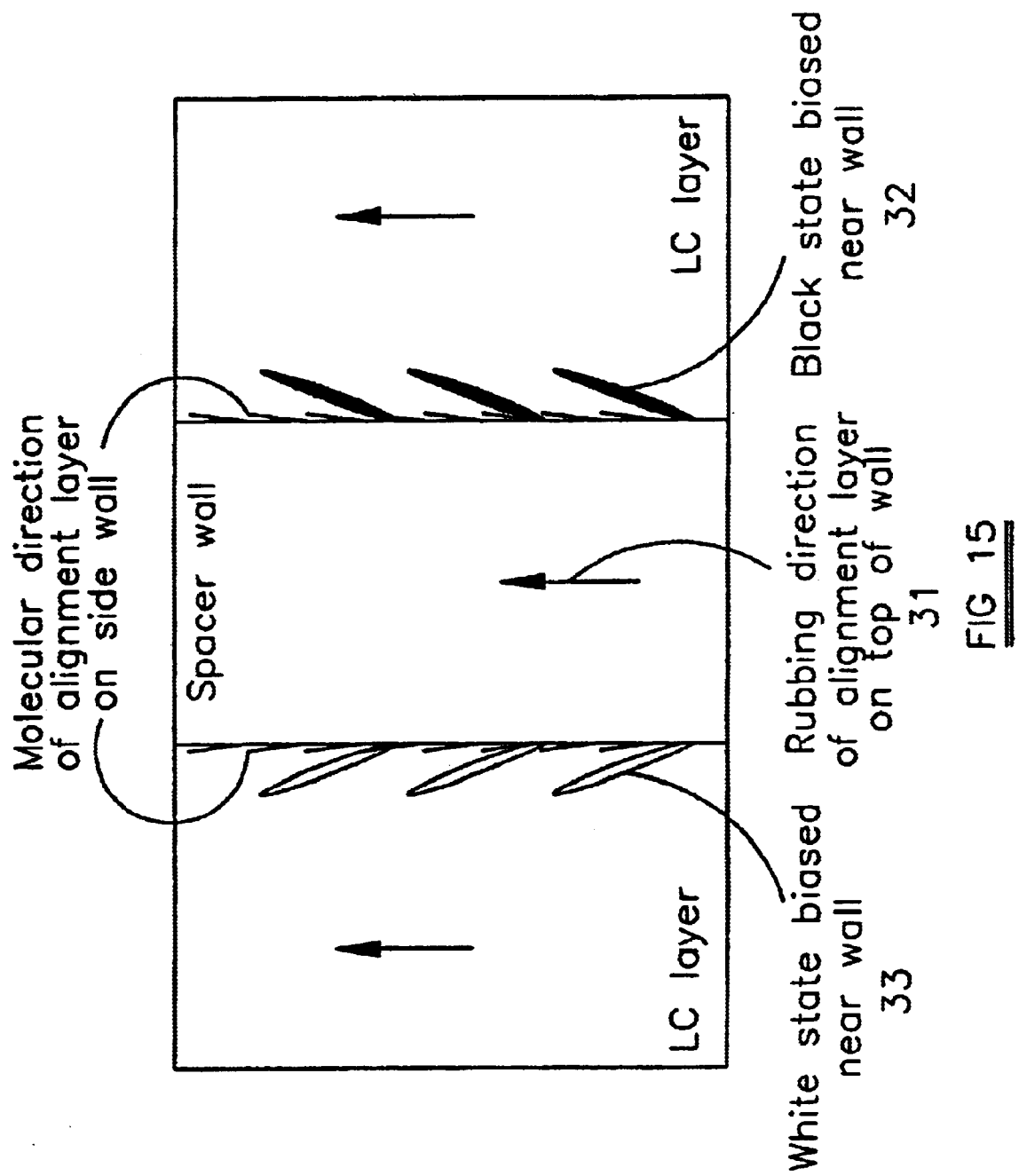
FIG. 15 is a diagram illustrating the effect of the alignment layer of FIG. 14 on liquid crystal molecular direction adjacent the spacer wall.

FIG. 14 illustrates part of a conventional ferroelectric LCD having an isotropic spacer wall 20 on which is formed an alignment layer 30. Conventional rubbing of the alignment layer 30 in the rubbing direction 31 induces a preferred molecular direction in the liquid crystal layer on the sides of the spacer wall 20. As shown in FIG. 15, the preferred direction tends to bias opposite switched states on opposite sides of the wall. Thus, to the right of the wall, the black pixel state is biased as illustrated at 32. On the other side of the wall, the white state is biased as shown at 33. If the biasing is strong enough to pin the white state adjacent the wall, this region must be covered by a black matrix in order to improve the contract ratio of the display. As described hereinbefore, this is disadvantageous.

Figure 16:
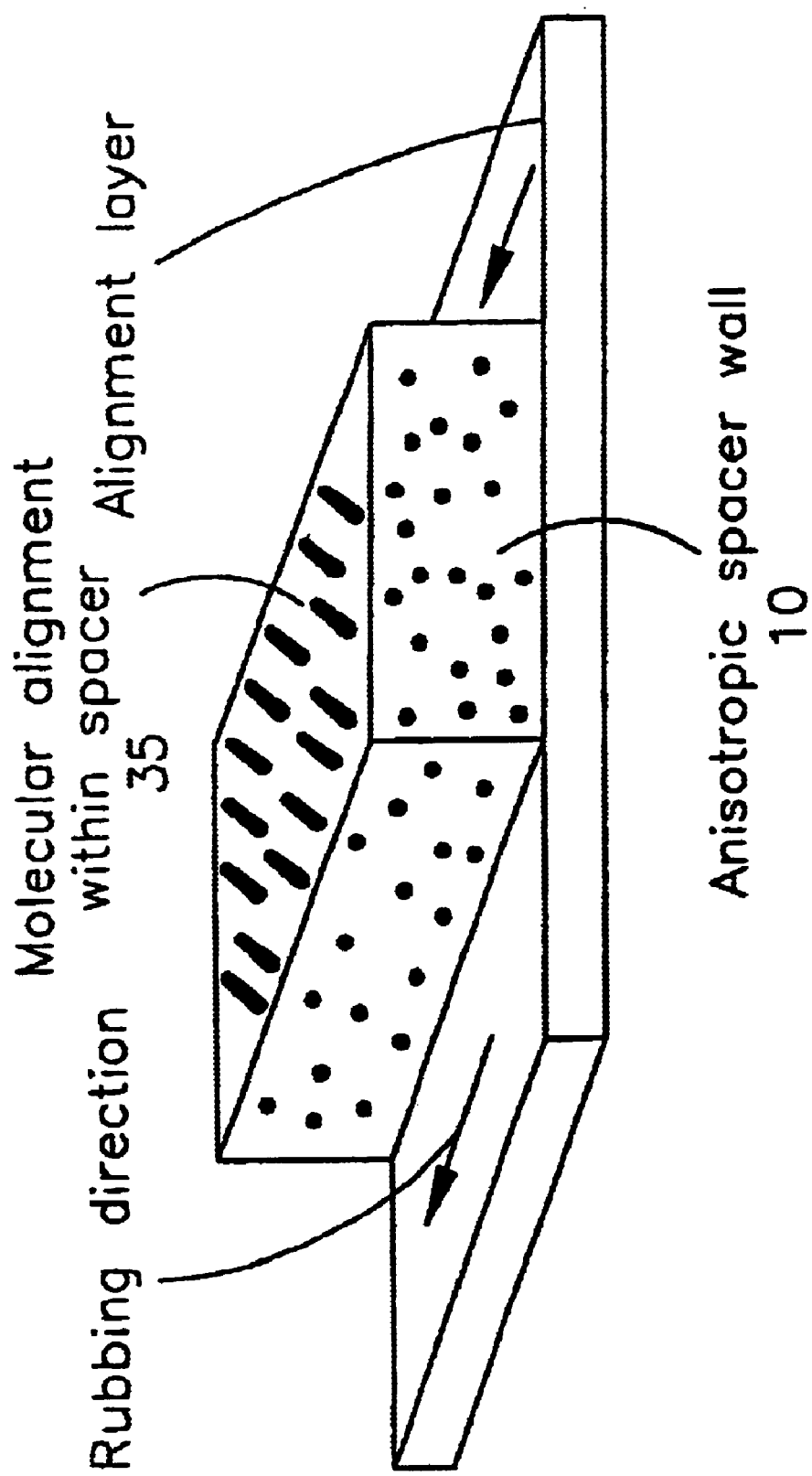
FIG. 16 is a diagram illustrating use of an anisotropic spacer wall in the embodiments of the invention.
Figure 17:
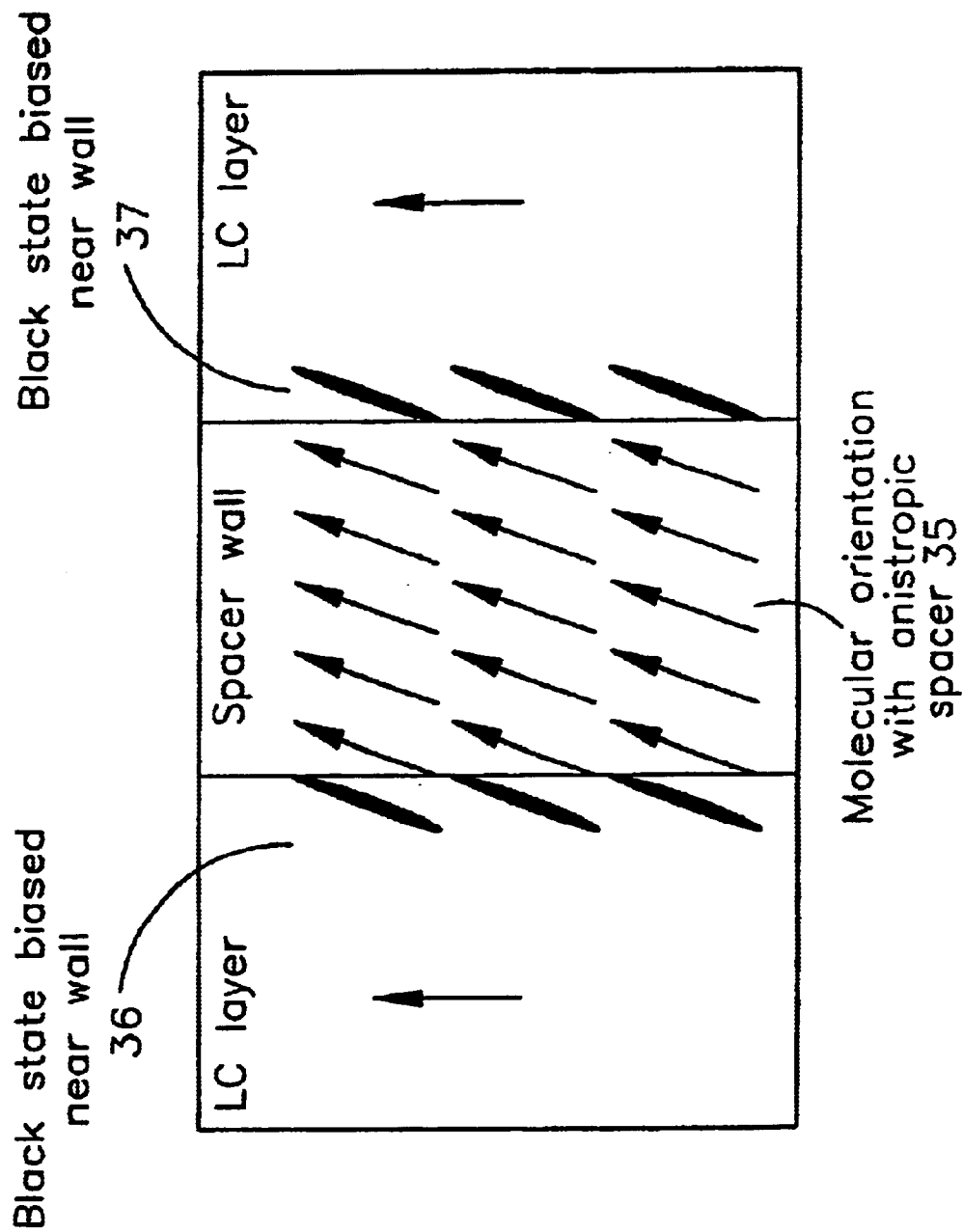
FIG. 17 is a diagram illustrating the effect of the spacer wall of FIG. 16 on liquid crystal molecular direction adjacent the spacer wall.

FIG. 16 illustrates a similar arrangement to that shown in FIG. 14 but with an anisotropic spacer wall 10 whose molecular alignment is illustrated at 35. In particular, as shown in FIG. 17, the molecular alignment within the spacer wall 10 corresponds to that of the liquid crystal in the black state. This results In the black state being biased in the liquid crystal adjacent the wall as shown at 36 and 37 in FIG. 17. It is not therefore necessary for the black mask to be extended because biasing or pinning of the black state does not compromise the contrast ratio of the device.

Although described with reference to a ferroelectric LCD, the same effect may also be used in BTN LCDs.

Figure 18:
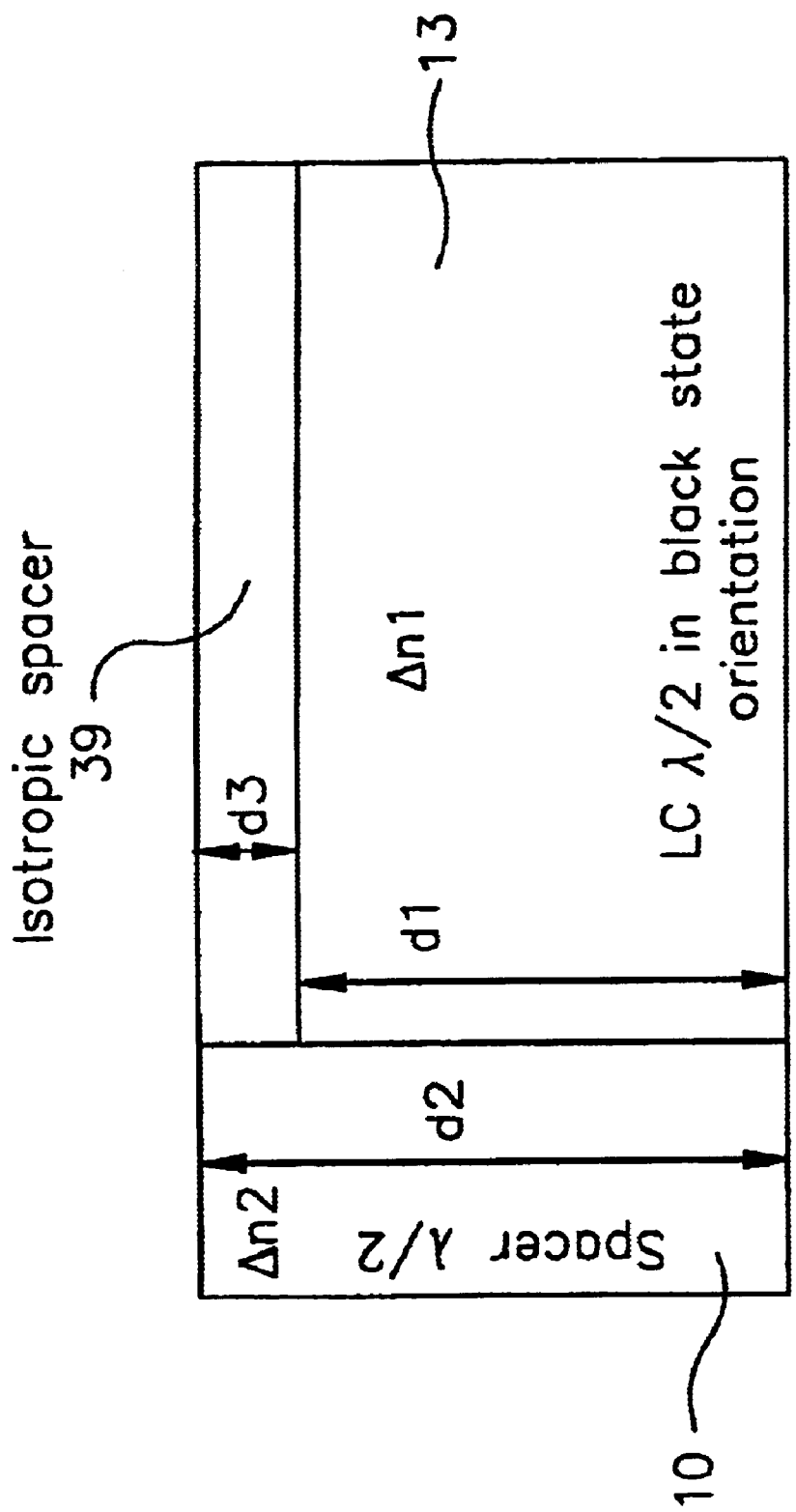
FIGS. 18 and 19 are diagrams illustrating compensation for spacers and liquid crystals of different birefringence or optical anisotropy.
Figure 19:
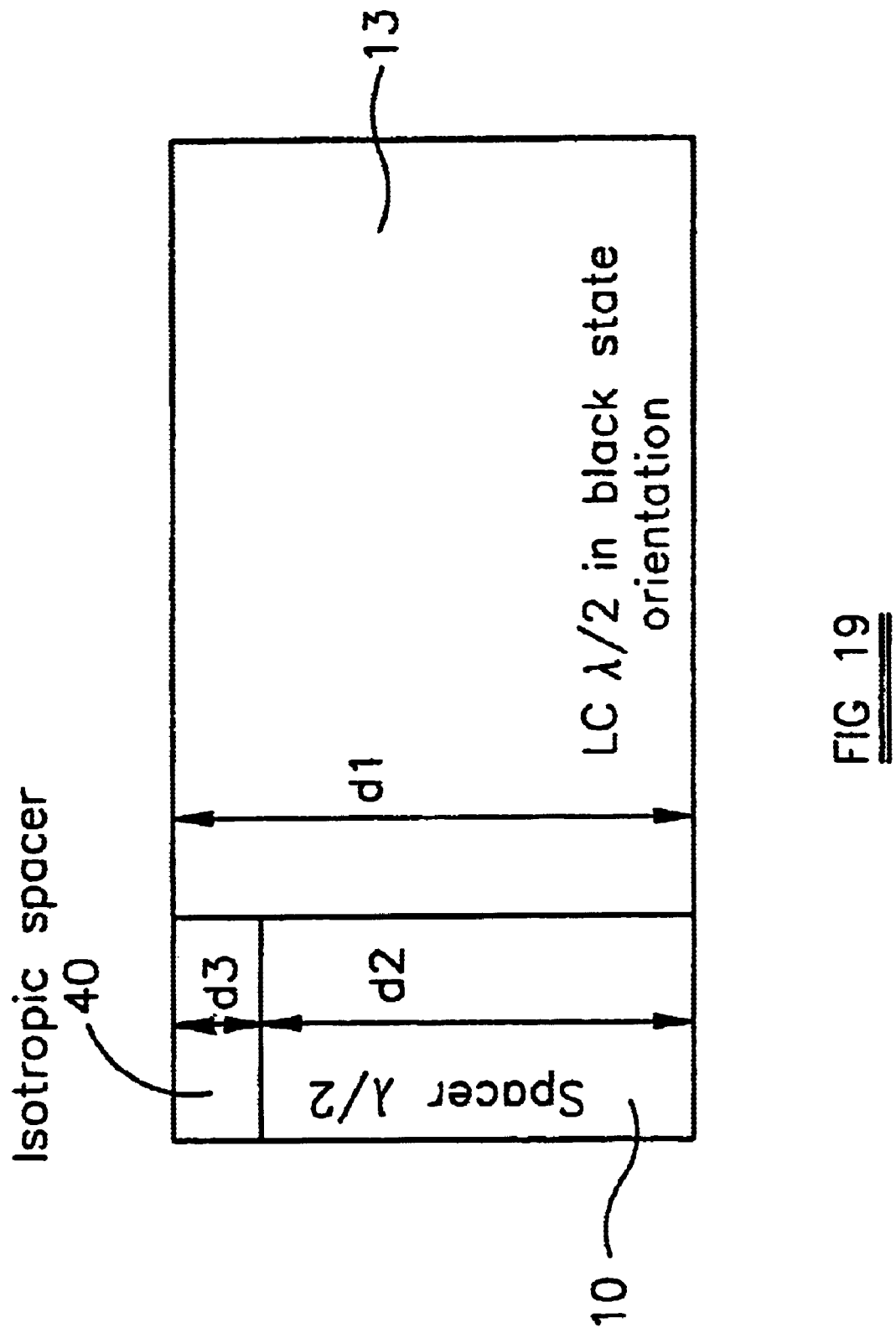

In the embodiments described hereinbefore, if the birefringence of the spacer is different from that of the liquid crystal material, then the thickness of the spacer and the liquid crystal layer must be different for them to act as equivalent optical elements. However, if the birefringence $\Delta n1$ of the liquid crystal layer 13 is greater than the birefringence $\Delta n2$ of the spacer 10 as illustrated in FIG. 18, the thickness d1 of the liquid crystal layer 13 has to be less than the thickness d2 of the spacer 10 so as to provide the same retardation. In this case, an isotropic layer 39 is provided adjacent the liquid crystal layer 13 with a thickness d3 which is substantially equal to the difference between the thicknesses d2 and d1. Conversely, if the birefringence of the spacer 10 in greater than that of the liquid crystal layer 13 as shown in FIG. 19, an isotropic spacer 40 may be provided adjacent the spacer 10 so as to match the thickness of the liquid crystal layer 13.

Figure 20:
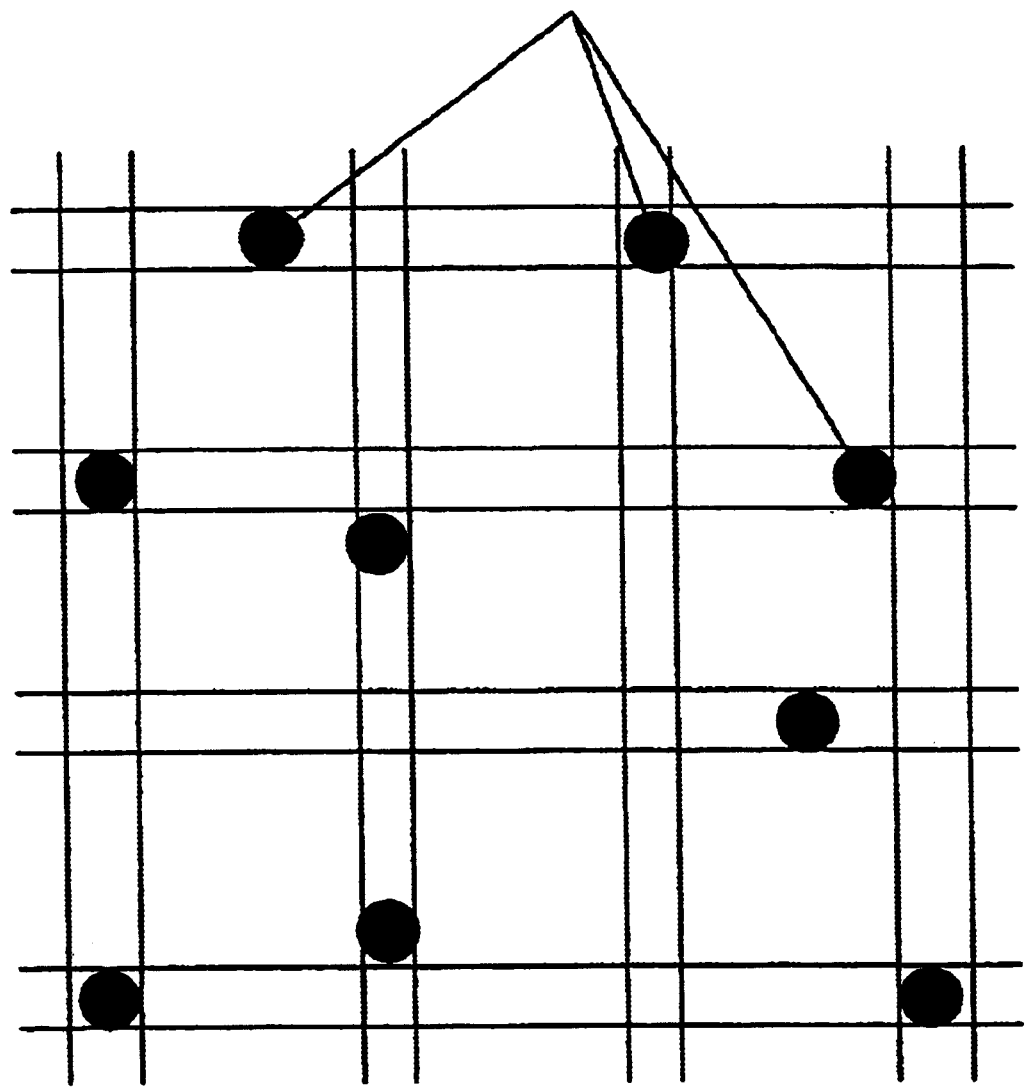
FIG. 20 is a diagrammatic plan view of an LCD constituting a fifth embodiment of the invention.

Although the spacers 10 in the embodiments described hereinbefore are in the form of continuous walls, the spacers may have any desired configuration. For example, FIG. 20 illustrates an arrangement in which the spacers are in the form of dots 10 in a substantially random pattern so as to avoid diffractive effects. However, the spacers may be of any desired arbitrary shape.

The spacers may be made, for example, from a reactive mesogen, for example available from Merck, Poole. UK. A reactive mesogen material is a curable liquid crystal material which requires initial alignment in its uncured state, for example on a polyimide alignment layer for alignment of liquid crystal cells (an example of such a layer is that known as X201 available from Chisso). A polyimide layer is deposited, cured and rubbed with a soft cloth prior to spin-coating with a reactive mesogen/solvent mixture. The reactive mesogen is aligned by the rubbed polyimide layer and is then cured using ultraviolet light.

In one method, the ultraviolet light is supplied by a collimated source incident on the reactive mesogen through a photomask for curing the film in selected areas only. The residual reactive mesogen material is then removed by flushing with a suitable solvent.

In another method, the whole reactive mesogen film is cured by ultraviolet irradiation and is then patterned. An advantage of this is that more conventional techniques leading to improved resolution of the spacers are used. The cured reactive mesogen film is coated with a photoresist which is exposed and developed to form a desired pattern. The pattern is then copied into the underlying reactive mesogen film using an oxygen plasma reactive ion etching process. Accurate transfer of high resolution features with controllable profile of the spacers may thus be achieved.

Figure 21:
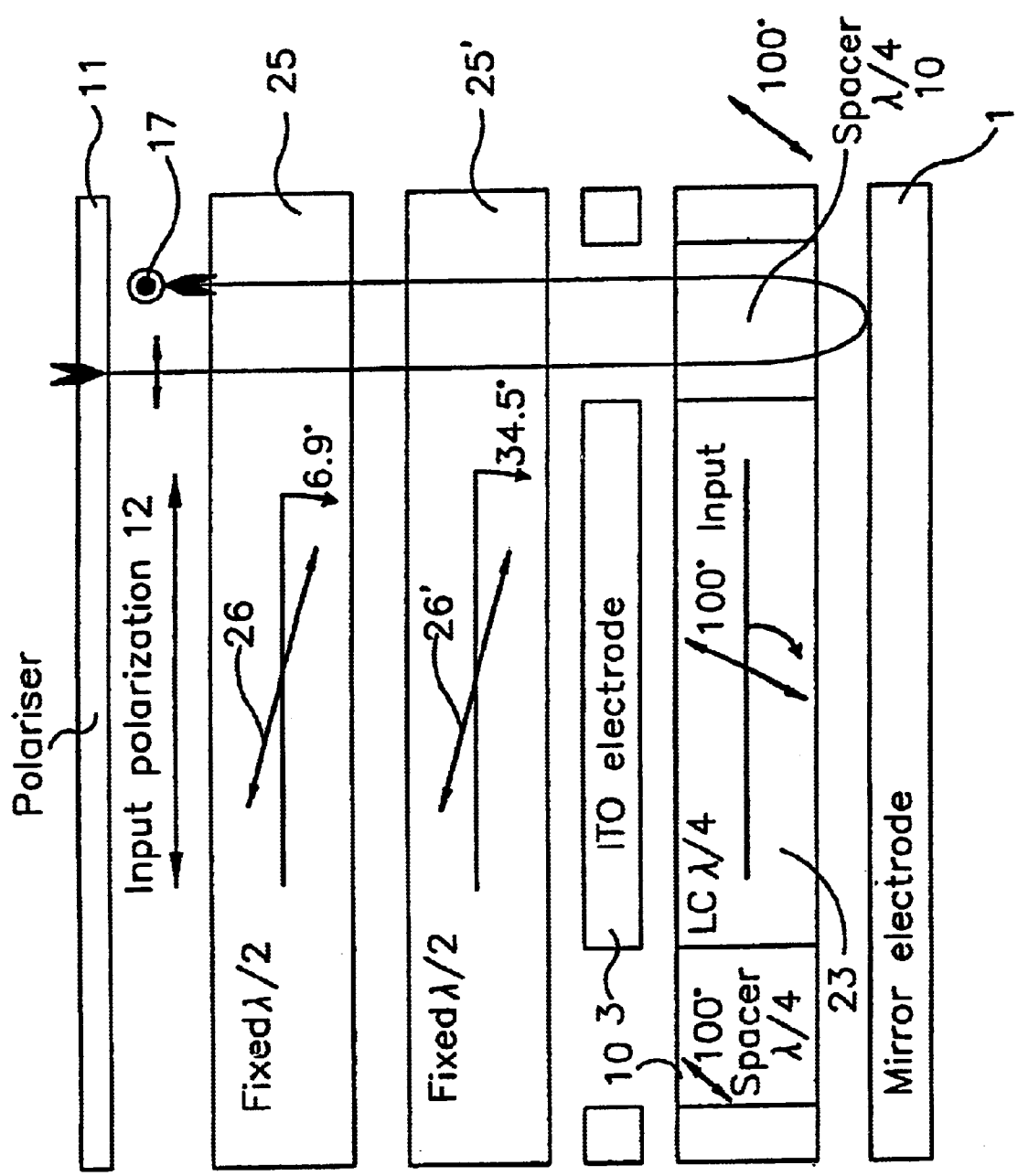
FIG. 21 is a cross-sectional diagram of an LCD constituting a sixth embodiment of the invention.

FIG. 21 shows another BTN device which differs from that shown in FIG. 12 in several respects. The half waveplate 25 has an optic axis 26 oriented at 6.9° to the input polarisation 12. A further half waveplate 25' is disposed between the half waveplate 25 and the liquid crystal layer 23 and has an optic axis 26' oriented at 34.5° to the input polarisation 12. The orientations of the optic axes 26 and 26' may be varied from these specific values but the orientation of the optic axis 26' should be substantially five times the orientation of the optic axis 26.

The liquid crystal layer 23 forms a quarter waveplate and is switchable between first and second states. In the first state corresponding to maximum light attenuation or the dark state of the device, the layer 23 has an optic axis oriented at 100° to the input polarisation 12. The spacers 10 similarly provide a quarter wave retardation and have optic axes oriented at 100° to the input polarisation 12. In the second state, the liquid crystal layer 23 has a twist of 360° (in either direction). This corresponds to the bright state of the device for maximum reflection.

Figure 22:
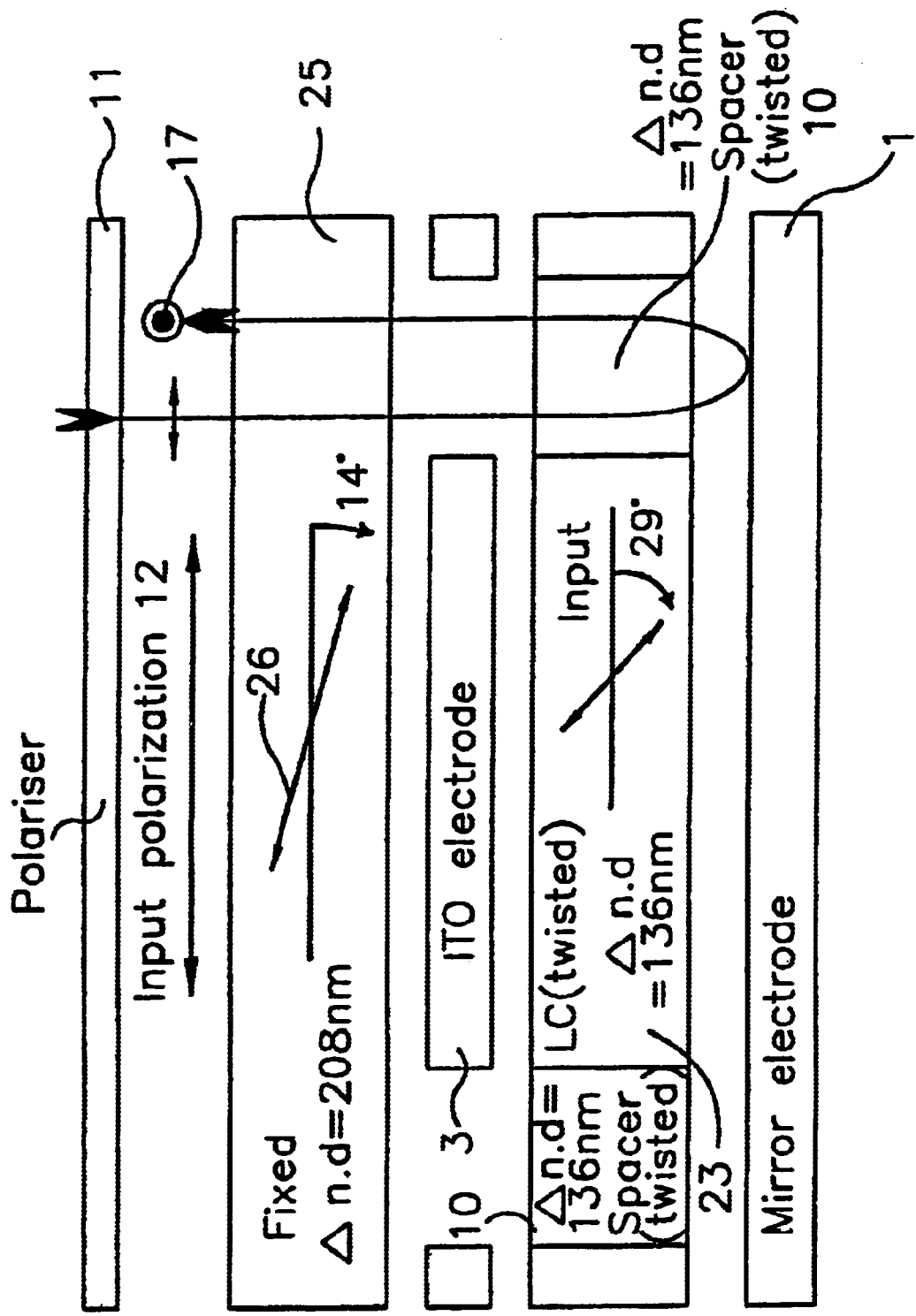
FIG. 22 is a cross-sectional diagram of an LCD constituting a seventh embodiment of the invention.

FIG. 22 shown another BTN device comprising a retarder with a retardation Δn.d of 208 nm and an optic axis 26 oriented at 14° to the input polarisation 12. This device comprises a liquid crystal layer 23 which is switchable between a first state having a twist angle of 67° corresponding to the dark state and a second state having a twist angle of −293° or +427° corresponding to the bright state. In the first state with the 67° twist angle, the layer 23 provides a retardation Δn.d of 136 nm. In the 67° twist state, the layer 23 has an input optic axis at the surface thereof nearer the fixed retarder 25 oriented at 29° to the input polarisation 12. The spacers 10 similarly have an input optic axis oriented at 29° to the input polarisation 12, a twist state of 67° and a retardation of 136 nm.

The embodiments shown in FIGS. 6, 8, 10, 12, 21 and 22 are merely examples of configurations which may be used in accordance with the present invention. Many other configurations are possible. For example, in the case of BTN devices, the present invention may be used with all of the embodiments described in British patent application no. 9911246.8, the contents of which are incorporated herein by reference. In some of these arrangements, an isotropic 360° twist state is used to achieve the dark state. Anisotropic spacers with a 360° twist are optically equivalent to isotropic spacers and either could be used in such embodiments, although it may be beneficial for a 360° dark state to be biased in the liquid crystal adjacent the spacers.

What is claimed is:

1. A liquid crystal device comprising: a liquid crystal layer containing a plurality of pixels separated by interpixel gaps, each of the pixels having a first optical state resulting in maximum light attenuation, characterised by at least one spacer disposed in the interpixel gaps and having substantially the same retardation as the first pixel optical state.

2. A device as claimed in claim 1, characteristic in that the at least one spacer comprises a plurality of pillars.

3. A device as claimed in claim 1, characterised in that the at least one spacer comprises a plurality of walls.

4. A device as claimed in claim 3, characterised in that the walls are continuous.

5. A device as claimed in claim 4, characterised in that the walls enclose the pixels.

6. A device as claimed in claim 5, characterised in that the walls fill the interpixel gaps.

7. A device as claimed in claim 1, characterised in that the optical property comprises changing the polarisation of light.

8. A device as claimed in claim 7, characterised in that the optical property comprises retardation with a predetermined optic axis orientation.

9. A device as claimed in claim 8, characterised by a linear polariser for transmitting light with a first direction of linear polarisation, a reflector, a half waveplate disposed between the polariser and the reflector and a quarter waveplate disposed between the half waveplate and the reflector, the liquid crystal layer comprising one or both of the half waveplate and the quarter waveplate.

10. A device as claimed in claim 9, characterised in that the liquid crystal layer is of the in-plane switching type and the at least one spacer has the same retardation as the liquid crystal layer and an optic axis oriented in the same direction as the liquid crystal layer in the first optical state.

11. A device as claimed in claim 10, characterised in that the liquid crystal of the layer is a smectic liquid crystal.

12. A device as claimed in claim 11, characterised in that the liquid crystal is a ferroelectric liquid crystal.

13. A device as claimed in claim 10, characterised in that the liquid crystal layer comprises the half waveplate whose optic axis is switchable between −7.5° and +15° to the first direction, the at least one spacer has an optic axis at +15° to the first direction, and the quarter waveplate has an optic axis at +75° to the first direction.

14. A device as claimed in claim 10, characterised in that the liquid crystal layer comprises the quarter waveplate whose optic axis is switchable between 75° and 120° to the first direction, the at least one spacer has an optic axis at 75° to the first direction, and the half waveplate has an optic axis at 15° to the first direction.

15. A device as claimed in claim 10, characterised in that the liquid crystal layer comprises the half waveplate whose optic axis is switchable between 0° and 15° to the first direction, the at least one spacer has an optic axis at 15° to the first direction, and the quarter waveplate comprises a further liquid crystal layer whose optic axis is switchable between 75° and 90° to the first direction and at least one further spacer having an optic axis at 75° to the first direction.

16. A device as claimed in claim 9, characterised in that the liquid crystal of the layer is a nematic liquid crystal.

17. A device as claimed in claim 16, characterised in that the liquid crystal layer is a bistable twisted nematic liquid crystal layer.

18. A device as claimed in claim 17, characterised in that the liquid crystal layer comprises the quarter waveplate which is switchable between a 0° twist state with an optic axis at 75° to the first direction and a 360° twist state, the at least one spacer has an optic axis at 75° to the first direction and the half waveplate has an optic axis at 15° to the first direction.

19. A device as claimed in claim 17, characterised in that the liquid crystal layer comprises the quarter waveplate which is switchable between a 0° twist state with an optic axis at 100° to the first direction and a 360° twist state, the at least one spacer has an optic axis at 100° to the first direction, the half waveplate has an optic axis at α° to the first direction, and a further half waveplate having an optic axis at 5α° to the first direction is disposed between the half waveplate and the liquid crystal layer.

20. A device as claimed in claim 19, characterised in that α is 6.9°.

21. A device as claimed in claim 8, characterised by a linear polariser for transmitting light with a first direction of linear polarisation, a reflector, and a retarder having a retardation of substantially 208 nm and an optic axis at 14° to the first direction, the liquid crystal layer being disposed between the retarder and the reflector and being switchable between a 67° twist state, having a retardation of substantially 136 nm and an optic axis at a surface of the liquid crystal layer nearer the retarder at 29° to the first direction, and a −293° or 427° twist state, the at least one spacer having an optic axis at a surface thereof nearer the retarder at 29° to the first direction and a 67° twist state.

22. A device as claimed in claim 8, characterised in that the at least one spacer has an optical anisotropy which is greater than that of the liquid crystal layer and is provided with an optically isotropic further spacer such that the combined thickness of the at least one spacer and the further spacer is substantially equal to the thickness of the liquid crystal layer.

23. A device as claimed in claim 8, characterised in that the liquid crystal layer has an optical anisotropy which is greater than that of the at least one spacer and is provided with an optically isotropic further spacer such that the combined thickness of the liquid crystal layer and the further spacer is substantially equal to the thickness of the at least one spacer.

24. A device as claimed in claim 1, characterised in that the at least one spacer comprises a cured reactive mesogen.

25. A device as claimed in claim 1, characterised in that the at least one spacer is arranged to bias the liquid crystal of the layer in contact therewith to the first optical state.

26. A device as claimed in claim 25, characterised in that the at least one spacer is optically anisotropic and has a molecular alignment corresponding to the molecular alignment of the liquid crystal when in the first optical state.

27. A device as claimed in claim 1, characterised by a passive matrix addressing arrangement including a set of strip electrodes constituting a or the reflector.

28. A liquid crystal device as claimed in claim 1, wherein the at least one spacer has a birefringence and thickness such that the at least one spacer acts as a half waveplate having the same retardation as the liquid crystal layer.

29. A liquid crystal device as claimed in claim 28, wherein the optic axis of the at least one spacer is fixed in a black state direction of the liquid crystal layer.

* * * * *

UNITED STATES PATENT AND TRADEMARK OFFICE
CERTIFICATE OF CORRECTION

PATENT NO.    : 6,618,113 B1
DATED         : September 9, 2003
INVENTOR(S)   : Ulrich et al.

It is certified that error appears in the above-identified patent and that said Letters Patent is hereby corrected as shown below:

Title page,
Item [*] Notice, delete the phrase "by 0 days" and insert -- by 176 days --

Signed and Sealed this

Fifth Day of October, 2004

JON W. DUDAS
*Director of the United States Patent and Trademark Office*